United States Patent
Uchida et al.

(10) Patent No.: US 8,810,752 B2
(45) Date of Patent: Aug. 19, 2014

(54) THIN BACKLIGHT SYSTEM AND LIQUID CRYSTAL DISPLAY DEVICE USING THE SAME

(75) Inventors: Tatsuo Uchida, Sendai (JP); Yoshito Suzuki, Sendai (JP); Tohru Kawakami, Sendai (JP); Kazuo Sekiya, Sendai (JP); Takahiro Ishinabe, Sendai (JP); Baku Katagiri, Sendai (JP); Yoshihiro Hashimoto, Osaka (JP); Shoichi Ishihara, Osaka (JP); Shuichi Kozaki, Osaka (JP); Yutaka Ishii, Osaka (JP)

(73) Assignees: Sharp Kabushiki Kaisha, Osaka (JP); Tohoku University, Miyagi (JP)

(*) Notice: Subject to any disclaimer, the term of this patent is extended or adjusted under 35 U.S.C. 154(b) by 571 days.

(21) Appl. No.: 13/130,787

(22) PCT Filed: Oct. 21, 2009

(86) PCT No.: PCT/JP2009/068137
§ 371 (c)(1), (2), (4) Date: Jun. 9, 2011

(87) PCT Pub. No.: WO2010/061699
PCT Pub. Date: Jun. 3, 2010

(65) Prior Publication Data
US 2011/0310330 A1    Dec. 22, 2011

(30) Foreign Application Priority Data
Nov. 27, 2008 (JP) ................................ 2008-302929

(51) Int. Cl.
*G02F 1/1335*    (2006.01)

(52) U.S. Cl.
USPC ............ 349/95; 349/62; 349/64; 349/65; 349/96

(58) Field of Classification Search
CPC ................................................. G02B 3/0056
USPC ........... 349/62, 64, 65, 68, 95, 96, 106
See application file for complete search history.

(56) References Cited

U.S. PATENT DOCUMENTS

| 6,305,813 B1* | 10/2001 | Lekson et al. ............... 362/625 |
| 2007/0279352 A1 | 12/2007 | Tanaka |

(Continued)

FOREIGN PATENT DOCUMENTS

| JP | 62-196625 A | 8/1987 |
| JP | 2006-179319 A | 7/2006 |

(Continued)

OTHER PUBLICATIONS

Official Communication issued in corresponding European Patent Application No. 09828948.1, mailed on Oct. 8, 2012.

(Continued)

*Primary Examiner* — Lucy Chien
*Assistant Examiner* — Paisley L Arendt
(74) *Attorney, Agent, or Firm* — Keating & Bennett, LLP

(57) ABSTRACT

A thin backlight system includes: a light emitting section emitting lights that have different dominant wavelengths; and a plurality of light transmitting portions, the thin backlight system deflecting the lights and then converging the lights on the plurality of light transmitting portions. The thin backlight system further includes: an imaging optical system provided to face surfaces, of the plurality of light transmitting portions, on which the lights are converged. The imaging optical system including a plurality of identical lenses arranged in a vertical and/or a horizontal direction at a pitch determined by multiplying a pitch at which the plurality of light transmitting portions are arranged in a vertical and/or a horizontal direction by the number of types of the different dominant wavelengths and being configured to converge the lights from the light emitting section on light transmitting portions to which the different dominant wavelengths of the lights correspond.

16 Claims, 13 Drawing Sheets

(56) References Cited

U.S. PATENT DOCUMENTS

| | | |
|---|---|---|
| 2008/0129922 A1 | 6/2008 | Kanemitsu et al. |
| 2008/0232133 A1 | 9/2008 | Segawa |
| 2010/0296314 A1 | 11/2010 | Segawa |

FOREIGN PATENT DOCUMENTS

| | | |
|---|---|---|
| JP | 2006-294256 A | 10/2006 |
| JP | 2007-199237 A | 8/2007 |
| JP | 2007-328218 A | 12/2007 |
| JP | 2008-122656 A | 5/2008 |
| JP | 2008-243386 A | 10/2008 |
| WO | 2008/062363 A2 | 5/2008 |

OTHER PUBLICATIONS

Taira et al., "Making a Color LCD Without Color Filters," Information Display 4&5/03, vol. 19, No. 4-5, Apr. 1, 2003, pp. 40-42.
Official Communication issued in International Patent Application No. PCT/JP2009/068137, mailed on Jan. 12, 2010.

\* cited by examiner

THIN BACKLIGHT SYSTEM AND LIQUID CRYSTAL DISPLAY DEVICE USING THE SAME

TECHNICAL FIELD

The present invention relates to a thin backlight system and a liquid crystal display device including the thin backlight system. Specifically, the present invention relates to (i) a thin backlight system for converging lights having different colors on back surfaces of respective corresponding picture elements, which correspond to the different colors of the lights and are included in each pixel of a transmissive liquid crystal display element, and (ii) a liquid crystal display device including the thin backlight system and the liquid crystal display element so as to carry out a full-color display.

BACKGROUND ART

Conventionally, a full-color liquid crystal display device has been realizing a full-color display by (i) dividing each pixel of a transmissive liquid crystal display element into three picture elements, (ii) attaching red (R), green (G), and blue (B) color filters to the respective three picture elements, (iii) emitting, from a backlight, white lights to the three picture elements, and (iv) controlling, by supplying voltage application signals to liquid crystal cells of the three picture elements, transmittance of each of the white lights which pass through the three picture elements.

However, since each of the R, G, and B color filters transmits a light of its corresponding waveband and absorbs a light of other waveband, the liquid crystal display device including the color filters suffers from a loss of approximately two-thirds of lights. That is, the liquid crystal display device including the color filters has a low use efficiency of lights. Note here that, although there has been a field sequential color method which is one of full-color display methods using no color filters, the field sequential color method has a problem in which color breakup occurs.

Meanwhile, there has been proposed a display device which includes a backlight device and a transmissive modulation element (refer to Patent Literature 1). The backlight device includes LEDs (light emitting diodes) serving as light sources, and improves a use efficiency of lights. The display device includes (i) an image display element (liquid crystal panel) which (a) has two-dimensionally arranged apertures, each of which can be controlled so as to transmit a light of each color at a controlled rate and (b) is capable of modulating transmitted lights, (ii) a light path synthesizing optical system including a number of pairs of microlenses arranged two-dimensionally, each of which microlenses has front and back surfaces serving as convex lenses, (iii) an illumination optical system for emitting chief rays of different colors toward the light path synthesizing optical system at different angles, and (iv) a plurality of light sources for emitting lights of different colors.

The display device described in Patent Literature 1 can be configured such that (i) lights of different colors from the plurality of light sources, which are subjected to an effect of the illumination optical system, enter the light path synthesizing optical system such that their chief rays are at respective different angles to the light path synthesizing optical system and (ii) the lights of different colors are converged on their corresponding apertures of the image display element through a refraction effect of the light path synthesizing optical system. Accordingly, it is possible to (a) divide each pixel into three picture elements and (b) converge lights of different colors on the respective three picture elements (i.e., it is possible to achieve color separation of each pixel by colored lights). According to Patent Literature 1, no color filters are necessary and therefore a light loss does not occur, provided that an ideal color separation is achieved. Note, however, that Patent Literature 1 does not exclude provision of color filters for preventing colors from being accidentally mixed due to light leakage resulting from an undesirable result of the color separation.

CITATION LIST

Patent Literature

Patent Literature 1
Japanese Patent Application Publication, Tokukai, No. 2007-328218 A (Publication Date: Dec. 20, 2007)

SUMMARY OF INVENTION

Technical Problem

According to the display device of Patent Literature 1, the backlight device includes (i) a light path synthesizing optical system including a number of pairs of microlenses arranged two-dimensionally, each of which microlenses has front and back surfaces serving as convex lenses, (ii) an illumination optical system for emitting chief rays of lights of different colors toward the light path synthesizing optical system at different angles, and (iii) a plurality of light sources for emitting lights of different colors. In a case where the backlight device is configured such that the chief rays of lights of different colors, which rays left the illumination optical system at different angles, are caused to directly enter the light path synthesizing optical system including the number of pairs of the microlenses arranged two-dimensionally, each of which microlenses has front and back surfaces serving as convex lenses, the chief rays of lights of different colors strike the light path synthesizing optical system with different angles of incidence from location to location in an incidence surface of the light path synthesizing optical system. In view of this, in order to cause the lights of different colors to be converged on respective corresponding apertures of the picture elements, it is necessary to differentiate a shape of each of the microlenses of the light path synthesizing optical system so that the shape is different from location to location in the incidence surface (or, further, in an emitting surface). For this reason, it is extremely difficult to design and manufacture such a backlight device. Therefore, as described in paragraph [0036] of Patent Literature 1, the display device includes a Fresnel sheet provided on an incidence surface side of microlens array. The Fresnel sheet deflects (changes directions of) the lights of different colors emitted from the illumination optical system at different angles so that the lights travel in an approximately identical direction, preferably in a direction substantially parallel to optical axes of the microlenses. In this way, the lights of different colors strike the microlens array with an approximately identical angle of incidence regardless of which part of the incidence surface the lights of the different colors strike.

However, for the purpose of achieving a thin display device, the display device needs to be configured such that the lights of different colors strike the Fresnel sheet with large angles of incidence. This causes the lights of different colors to be greatly refracted by the Fresnel sheet, thereby causing a large chromatic aberration. As a result, penumbrae of the respective lights of different colors overlap with one another over a wide range, thereby causing a tone of color to greatly deviate from a target tone. Eventually, image quality is deteriorated.

That is, a conventional backlight device, which is for use in a thin full-color display device in which pixels are subjected to a color separation by lights of different colors, has a problem in which a large chromatic aberration occurs and therefore image quality is deteriorated.

The present invention has been made in view of the problem, and an object of the present invention is to provide a thin backlight system in which a chromatic aberration is small in spite of its small thickness.

Solution to Problem

The inventors of the present invention have been diligently worked so as to achieve a solution to the problem, and arrive at a configuration in which lights of different colors are caused to strike an imaging optical system (a light converging element, microlens array) at an approximately identical angle of incidence by being reflected (partially reflected or totally reflected) instead of being refracted. As a result, the inventors of the present invention have made the present invention configured as below.

A thin backlight system in accordance with the present invention includes: a light emitting section for emitting lights that have different dominant wavelengths; a light deflection system for deflecting the lights from the light emitting section; and a plurality of light transmitting parts on which the lights deflected by the light deflection system are to be converged, the light deflection system including: an imaging optical system facing surfaces, of the plurality of light transmitting parts, on which the lights are to be converged; and an irradiating optical system facing (i) the light emitting section and (ii) a surface, of the imaging optical system, through which the lights enter the imaging optical system, the irradiating optical system being configured such that (a) the lights from the light emitting section are deflected by the irradiating optical system by at least being reflected by the irradiating optical system and (b) the lights thus deflected, which lights have the different dominant wavelengths, leave the irradiating optical system at respective different angles so as to travel in substantially parallel to a normal to each of the plurality of light transmitting parts, and the imaging optical system (I) having a plurality of identical lenses arranged so as to correspond to a pitch at which light transmitting part groups are arranged, each of the light transmitting part groups consisting of light transmitting parts divided into the number of types of the different dominant wavelengths and (II) being configured so as to converge, in accordance with the different angles, the lights from the irradiating optical system on light transmitting parts to which the different dominant wavelengths of the lights correspond.

According to the configuration, the light deflection system includes the imaging optical system facing the surfaces, of the plurality of light transmitting parts, on which the lights are converged, the imaging optical system (i) having a plurality of identical lenses arranged so as to correspond to a pitch at which light transmitting part groups are arranged, each of the light transmitting part groups consisting of light transmitting parts divided into the number of types of the different dominant wavelengths and (ii) being configured so as to converge, in accordance with the different angles, the lights from the irradiating optical system on light transmitting parts to which the different dominant wavelengths of the lights correspond. This makes it possible to converge the lights that have different dominant wavelengths, which lights are emitted from the light emitting section, to corresponding ones of the plurality of light transmitting parts such that the lights are separate from each other.

Further, according to the configuration, the light deflection system includes the irradiating optical system facing (i) the light emitting section and (ii) the surface, of the imaging optical system, from which the lights enter the imaging optical system, the irradiating optical system being configured such that (a) the lights from the light emitting section are deflected by the irradiating optical system by at least being reflected by the irradiating optical system and (b) the lights thus deflected, which lights have the different dominant wavelengths, leave the irradiating optical system at respective different angles so as to travel in substantially parallel to a normal to each of the plurality of light transmitting parts. Therefore, the lights that have the different dominant wavelengths, which lights are emitted from the light emitting section, do not cause a large chromatic aberration.

Accordingly, the thin backlight system in accordance with the present invention is capable of suppressing a chromatic aberration in spite of its small thickness.

A thin backlight system in accordance with the present invention includes: a light emitting section for emitting lights that have different dominant wavelengths; and a plurality of light transmitting parts arranged in a predetermined manner, the thin backlight system deflecting the lights and then converging the lights on the plurality of light transmitting parts, said thin backlight system, further including: an imaging optical system provided so as to face surfaces, of the plurality of light transmitting parts, on which the lights are to be converged, the imaging optical system (i) having a plurality of identical lenses arranged in a vertical and/or a horizontal direction at a pitch found by multiplying a pitch at which the plurality of light transmitting parts are arranged in a vertical and/or a horizontal direction by the number of types of the different dominant wavelengths and (ii) being configured so as to converge the lights from the light emitting section on light transmitting parts to which the different dominant wavelengths of the lights correspond; and an irradiating optical system provided so as to face (a) the light emitting section and (b) a surface, of the imaging optical system, through which the lights enter the imaging optical system, the irradiating optical system being configured such that (I) the lights from the light emitting section, which lights have the different dominant wavelengths, are deflected by the irradiating optical system by at least being reflected by the irradiating optical system so as to be separate from each other, (II) the lights thus deflected leave the irradiating optical system so as to travel in substantially parallel to a normal to each of the plurality of light transmitting parts and (III) the lights enter the plurality of identical lenses of the imaging optical system through a surface, of the imaging optical system, which is opposite to the plurality of light transmitting parts.

According to the configuration, the thin backlight system includes the imaging optical system provided so as to face the surfaces, of the plurality of light transmitting parts, on which the lights are converged, the imaging optical system (i) having a plurality of identical lenses arranged in a vertical and/or a horizontal direction at a pitch found by multiplying a pitch at which the plurality of light transmitting parts are arranged in a vertical and/or a horizontal direction by the number of types of the different dominant wavelengths and (ii) being configured so as to converge the lights from the light emitting section on light transmitting parts to which the different dominant wavelengths of the lights correspond. This makes it possible to converge the lights that have different dominant wavelengths, which lights are emitted from the light emitting section, to corresponding ones of the plurality of light transmitting parts such that the lights are separated from each other.

According to the configuration, the thin backlight system includes the irradiating optical system provided so as to face (i) the light emitting section and (ii) the surface, of the imaging optical system, through which the lights enter the imaging optical system, the irradiating optical system being configured such that (a) the lights from the light emitting section, which lights have the different dominant wavelengths, are deflected by the irradiating optical system by at least being reflected by the irradiating optical system so as to be separate from each other, (b) the lights thus deflected leave the irradiating optical system so as to travel in substantially parallel to a normal to each of the plurality of light transmitting parts and (c) the lights enter the plurality of identical lenses of the imaging optical system through a surface, of the imaging optical system, which is opposite to the plurality of light transmitting parts. Therefore, the lights that have the different dominant wavelengths, which lights are emitted from the light emitting section, do not cause a large chromatic aberration.

Accordingly, the thin backlight system in accordance with the present invention is capable of suppressing a chromatic aberration in spite of its small thickness.

The thin backlight system in accordance with the present invention is configured such that each of the plurality of identical lenses of the imaging optical system deflects a light path by (i) a shape of a surface of said each of the plurality of identical lenses or (ii) refractive index distribution in said each of the plurality of identical lenses.

Note here that, in a case where the light path is deflected by the shape of the surface, the light path is deflected by a difference in a refractive index at an interface on the surface of said each of the plurality of identical lenses in accordance with the Snell's law. On the other hand, in a case where the light path is deflected by the refractive index distribution, the light path is deflected by causing refractive indices to be distributed in said each of the plurality of identical lenses. That is, a refractive index is caused to be different at a center and periphery of said each of the plurality of identical lenses so that said each of the plurality of identical lenses has a refractive index gradient, and a light is deflected by the refractive index gradient.

The thin backlight system in accordance with the present invention is configured such that the plurality of identical lenses of the imaging optical system serve as (i) a fly-eye lens, (ii) a lenticular lens, or (iii) a combination of the fly-eye lens and the lenticular lens.

The thin backlight system in accordance with the present invention is configured such that the irradiating optical system includes a collimation reflection mirror.

The thin backlight system in accordance with the present invention is configured such that the irradiating optical system includes a total reflection prism sheet.

The thin backlight system in accordance with the present invention is configured such that the irradiating optical system includes a combination of a collimation reflection mirror and a total reflection prism sheet.

The thin backlight system in accordance with the present invention is configured such that: the total reflection prism sheet has repeats of a unit prism; and the unit prism is repeated at a pitch that is (i) larger than a wavelength of each of the lights from the light emitting section and (ii) equal to or smaller than one-half a pitch at which the plurality of identical lenses of the imaging optical system are arranged.

The thin backlight system in accordance with the present invention is configured such that the irradiating optical system includes a total reflection Fresnel sheet.

The thin backlight system in accordance with the present invention is configured such that the irradiating optical system has array of total reflection surfaces which deflect the lights from the light emitting section by at least totally reflecting the lights; and the imaging optical system includes an optical sheet having, on a first side from which the optical sheet receives the lights, surfaces of the respective plurality of identical lenses, the surfaces being integral with the respective total reflection surfaces.

The thin backlight system in accordance with the present invention is configured such that the optical sheet has repeats of a unit lens; and the unit lens is (i) larger than a wavelength of each of the lights from the light emitting section and (ii) equal to or smaller than a length found by multiplying a pitch at which the plurality of light transmitting parts are arranged by the number of the types of the different dominant wavelengths of the lights from the light emitting section.

The thin backlight system in accordance with the present invention is configured such that the irradiating optical system has array of total reflection surfaces which deflect the lights from the light emitting section by totally reflecting the lights; and the imaging optical system includes an optical sheet having, (i) on a second side from which the optical sheet emits the lights, surfaces of the respective plurality of identical lenses and (ii) on a first side from which the optical sheet receives the lights, the array of the total reflection surfaces.

The thin backlight system in accordance with the present invention is configured such that the total reflection surfaces, of the optical sheet, which are on the first side are arranged at a pitch that is (i) larger than a wavelength of each of the lights from the light emitting section and (ii) equal to or smaller than one-half a pitch at which the plurality of identical lenses on the second side are arranged.

The thin backlight system in accordance with the present invention is configured such that the light emitting section includes (i) at least one of an LED light source, a laser light source, and an organic EL light source or (ii) (a) said at least one of the LED light source, the laser light source, and the organic EL light source and (b) a light guide.

A thin backlight system in accordance with the present invention further includes a reflective element provided on an optical path from the light emitting section to the imaging optical system, the reflective element transmitting a first light polarized in a specified direction and reflecting a second light other than the first light.

The thin backlight system in accordance with the present invention is configured such that both the first light and the second light are caused to travel to the imaging optical system.

A composite thin backlight system in accordance with the present invention includes: a plurality of backlight units arranged in parallel with each other, each of the plurality of backlight units being the thin backlight system.

A composite thin backlight system in accordance with the present invention further includes: means for controlling an amount of a light emitted from the light emitting section, the amount being controlled for each of the plurality of backlight units or for every two or more of the plurality of backlight units.

The composite thin backlight system in accordance with the present invention is configured such that at least one type of (i) the collimation reflection mirrors, (ii) the total reflection prism sheets, (iii) the total reflection Fresnel sheets, (iv) the optical sheets, (v) the fly-eye lenses, and (vi) the lenticular lenses, of the plurality of backlight units are integral with each other so as to correspond to two or more of the plurality of backlight units.

A composite thin backlight system in accordance with the present invention further includes: light shielding means provided between adjacent ones of the plurality of backlight units, the light shielding means preventing a light, which is emitted from the light emitting section of either one of the adjacent ones of the plurality of backlight units, from entering the other one of the adjacent ones of the plurality of backlight units.

A liquid crystal display device in accordance with the present invention includes: the thin backlight system, said liquid crystal display device, further including: a liquid crystal element including: a liquid crystal layer in which picture elements serving as the plurality of light transmitting parts are arranged; a first glass substrate provided on a first side from which a light is received; and a second glass substrate provided on a second side from which the light is emitted, the liquid crystal layer being sandwiched between the first glass substrate and the second glass substrate; a drive element for driving the liquid crystal element; a polarizer provided on the first glass substrate; and an analyzer provided on the second glass substrate.

A liquid crystal display device in accordance with the present invention further includes a diffusing plate provided on a surface, of the analyzer, which is on the second side.

The liquid crystal display device in accordance with the present invention is configured such that the liquid crystal layer, the drive element, the analyzer, the diffusing plate, and the second glass substrate are stacked in this order from the liquid crystal layer toward the second side, instead of order of the liquid crystal layer, the drive element, the second glass substrate, the analyzer, and the diffusing plate from the liquid crystal layer toward the second side.

A liquid crystal display device in accordance with the present invention further includes: a diffusing element provided between the drive element and the second glass substrate, the diffusing element having a function of keeping a polarized state of a light.

The liquid crystal display device in accordance with the present invention is configured such that the liquid crystal layer, the drive element, the diffusing element, the analyzer, and the second glass substrate are stacked in this order from the liquid crystal layer toward the second side instead of order of the liquid crystal layer, the drive element, the diffusing element, the second glass substrate, and the analyzer from the liquid crystal layer toward the second side.

A liquid crystal display device in accordance with the present invention further includes a color filter layer provided on a surface, of the second glass substrate, which is on the first side.

The liquid crystal display device in accordance with the present invention is configured such that the imaging optical system of the thin backlight system is provided between the polarizer and the first glass substrate.

The liquid crystal display device in accordance with the present invention is configured such that stack positions of the liquid crystal element and the drive element are exchanged.

Advantageous Effects of Invention

According to the present invention, a thin backlight system can converge lights having different dominant wavelengths, which lights are emitted from a light emitting section, on a respective plurality of corresponding light transmitting parts. That is, it is possible to spatially separate the lights having the different dominant wavelengths. Further, in a case where the backlight system is used as a surface light source of a liquid crystal display device, it is possible to converge the lights having different dominant wavelengths, which lights are emitted from the light emitting section and spatially separated from each other, on corresponding portions of a liquid crystal layer. This makes it possible to achieve both (i) an increase in a use efficiency of the lights from the light emitting section and (ii) a full-color display. Further, since the lights having the different dominant wavelengths, which lights are emitted from the light emitting section, are deflected by being partially or totally reflected so as to travel in substantially parallel to a normal to an imaging optical system, a large chromatic aberration does not occur.

That is, a thin backlight system in accordance with the present invention is capable of suppressing a chromatic aberration in spite of its small thickness.

DESCRIPTION OF EMBODIMENT

Embodiments of the present invention are described below with reference to FIGS. 1 through 13 and 20. Note that the present invention is not limited to the embodiments.

Figure 1:
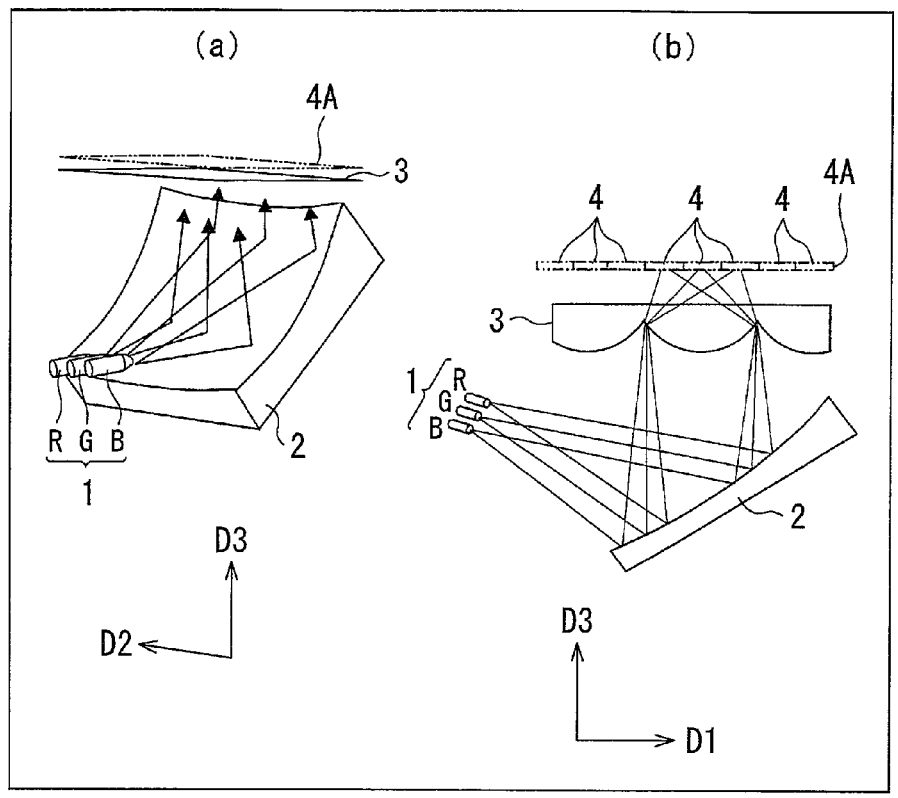
FIG. 1 is a view schematically illustrating a first example of the present invention.

A preferred embodiment of the present invention is characterized by, for example as illustrated in FIG. 1, arrangements of an irradiating optical system and an imaging optical system. The irradiating optical system includes a collimation reflection mirror 2, which deflects a plurality of lights from a plurality of light sources (light emitting section) 1 for emitting lights having different dominant wavelengths, i.e., lights of R (red), G (green), and B (blue), so that the lights are separated from each other so as to travel in substantially parallel with a normal to a microlens array 3 (described later). The irradiating optical system includes the microlens array 3 for converging the lights from the collimation reflection mirror 2, which lights are substantially parallel to the normal to the microlens array 3, on positions (i.e., positions of light transmitting parts 4 of an array 4A, which includes the light transmitting parts 4 arranged in a vertical and/or a horizontal direction) corresponding to the respective plurality of light sources 1. The microlens array 3 is constituted by a plurality of identical lenses arranged in a vertical and/or a horizontal direction at a pitch found by multiplying (i) a pitch at which the light transmission parts 4 are arranged in a vertical and/or a horizontal direction by (ii) the number of types of the different dominant wavelengths (note that, although the number is three in this example, the number can be four or greater)".

According to this configuration, the lights are deflected by the collimation reflection mirror 2 so as to be substantially orthogonal to a surface, of the microlens array 3, from which the lights enter the microlens 3. That is, the lights are deflected so as to travel toward the microlens array 3 in substantially parallel with a normal to a surface, of the microlens array 3, which faces the light transmitting parts 4. This allows the microlens array 3, which is provided immediately above the collimation reflection mirror 2, to converge the lights while spatially separating the lights from one another in accordance with different angles at which the lights having the different dominant wavelengths leave the collimation reflection mirror 2.

Specifically, according to a thin backlight system in accordance with the present invention, the lights from the plurality of light sources 1 are deflected by the collimation reflection mirror 2 so as to enter the microlens array 3 at an angle of −20° thorough 20° to a direction orthogonal to a surface from which the lights enter, i.e., a normal to the surface, of the microlens array 3, which faces the light transmitting parts 4. The following description specifically discusses, with reference to (b) of FIG. 1, an angle at which a light is reflected by the collimation reflection mirror 2 so as to travel toward the microlens array 3.

According to (b) of FIG. 1, lights emitted from RGB-LED light sources 1 are reflected by the collimation reflection mirror 2 so as to travel toward the microlens array 3. Meanwhile, virtual images of the RGB-LED light sources 1 appear around a position indicated by D1 in (b) of FIG. 1 due to an effect of the collimation reflection mirror 2. Since the lights can be regarded as directly coming from the virtual images when seen from the microlens array 3, it is possible to find, from "a distance from the virtual images to the microlens array 3" and "a gap between adjacent ones of the RGB-LED light sources 1", distribution of angles at which the lights enter the microlens array 3.

That is, the distribution of the angles at which the lights enter the microlens array 3 can be found through an equation of (the distribution of the angles at which the lights enter the microlens array 3)=±(Arctan ((the gap between adjacent ones of the RGB-LED light sources 1)/(the distance from the virtual images to the microlens array 3))+α).

Note here that α depends on the degree of collimation by the collimation reflection mirror. In a case of an ideal collimation reflection mirror, α=0. However, in reality, α rarely becomes 0 because of production variations of the collimation reflection mirror, assembly variations of the collimation reflection mirror, assembly variations of a light source section, or the like.

That is to say, taking into account a realistic condition, the distribution of the angles at which the lights enter the microlens array 3 is approximately ±20°

Further, the collimation reflection mirror 2 deflects the lights by at least reflecting the lights so that the lights travel toward the microlens array 3. Accordingly, as compared with a case where the lights are deflected by being refracted, it is possible to reduce a distance from the light transmitting parts 4 (for example, a liquid crystal layer serving as array of the light transmitting parts 4) to the light sources 1 in a thickness direction. This makes it possible to achieve a thin backlight system. Note that the present invention encompasses also a configuration in which the lights are deflected by being reflected and refracted to travel toward the microlens array 3.

The following description discusses a preferable embodiment of the collimation reflection mirror 2. Since the collimation reflection mirror 2 is used for causing lights emitted from the light sources 1 to travel toward an imaging optical system such that the lights are in parallel with one another, an ideal configuration of the collimation reflection mirror 2 is the one called an off-axis parabolic reflector. The collimation reflection mirror 2 for use in the present invention is a mirror having a partial shape of a paraboloid surface whose focal point is on the light sources 1. Such a mirror is generally called the off-axis parabolic reflector because the part, of the paraboloid surface, which serves as the mirror deviates from an optical axis passing through the focal point.

A reflection surface of the collimation reflection mirror 2 can be made from a reflective member in a form of a plate, a reflective member in a form of a film, or the like. Examples of such a reflective member encompass metal such as silver and aluminum. Out of these, silver is preferable because of its high reflectance (normal reflectance). The reflectance can be further increased by stacking, on metal etc., a dielectric multilayer film including a plurality of dielectric films. Out of those reflective members, it is preferable to use aluminum on which a dielectric multilayer film is stacked (i.e., aluminum coated with a dielectric multilayer film), because such aluminum achieves a highest ratio of a light entering the image optical system. The aluminum on which the dielectric multilayer film is stacked (i.e., aluminum coated with the dielectric multilayer film) has a reflectance of 95% through 98%, which is higher than that of metal alone.

Note in the Description that a thickness direction of the backlight system (such a direction is referred to as a system thickness direction, which is indicated by D3 in FIG. 1) is regarded as a thickness direction of the array 4A of the light transmitting parts. A length direction of the backlight system (such a direction is referred to as a system length direction, which is for example a direction indicated by D1 in FIG. 1) is regarded as one of vertical and horizontal directions in which the light transmitting parts 4 are arranged in a plane orthogonal to the thickness direction of the light transmitting parts 4, which one direction is orthogonal to a plane which intersects chief rays from the light sources 1. A width direction of the backlight system (such a direction is referred to as a system width direction, which is for example a direction indicated by D2 in FIG. 1) is regarded as a direction orthogonal to both the system thickness direction and the system length direction.

Conceptually speaking, according to the present invention, a positional relation among a plurality of light sources, which are provided in respective positions spatially different from one another, is regarded as position information. After lights emitted from the plurality of light sources go through (i.e., are reflected by) the collimation reflection mirror 2, lights from an identical one of the plurality of light sources travel in parallel with each other (i.e., leave the collimation reflection mirror 2 at an identical angle), whereas lights from respective different ones of the plurality of light sources leave the collimation reflection mirror 2 at respective different angles. According to the present invention, this is referred to as a state in which lights are emitted "in substantially parallel with each other". That is, according to the present invention, the position information of the plurality of light sources is converted into angle information by causing lights to go through (i.e., be reflected by) the collimation reflection mirror 2.

In a case where lights substantially parallel with each other are caused to enter the microlens array 3, the lights will be converged on respective different positions depending on angles at which the lights are emitted from the light sources 1 toward the collimation reflection mirror 2. That is, the lights are converged so as to be spatially separated from one another. That is, the angle information converted by the collimation reflection mirror 2 is again converted into position information by causing the lights to pass through the microlens array 3.

This means that it is possible to control, by changing positions of the plurality of light sources, positions on which lights are to be converged after passing through the microlens array 3. For example, in a case where target positions on which lights are to be converged are on the liquid crystal layer, adjusting the positions of the light sources 1 allows for fine adjustment of the target positions. In that case, an amount of movement of each of the target positions, on which the lights are to be converged through the microlens array 3, is found by ly×d/lx, where lx is a length of a chief ray from a corresponding one of the light sources 1 to the microlens array 3 via the collimation reflection mirror 2, ly is a distance from the microlens array 3 to the liquid crystal layer, and d is an amount by which a position of the corresponding one of the light sources 1 is moved in the system width direction or in the system thickness direction. For example, in a case where lx=80 mm and ly=2 mm, and the position of the corresponding one of the light sources 1 is moved by 10 mm in the system width direction, the amount of movement of the each of the positions on which the lights are to be converged is 0.25 mm. The following description specifically discusses, with reference to FIG. 20, a theory of finding the amount of movement of "ly×d/lx".

Figure 20:
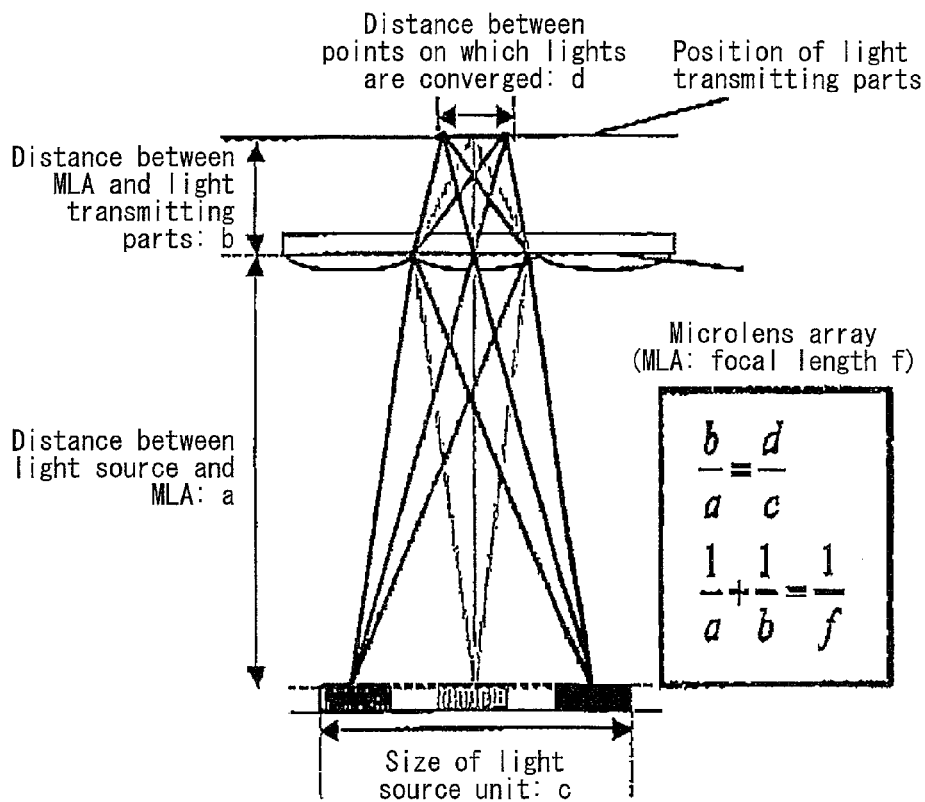
FIG. 20 is a view illustrating an amount of movement of a position on which a light passed through microlens array in accordance with the present invention is converged.

In a case where a microlens array is provided between the plurality of light sources and the positions on which the lights are to be converged, an optical system as illustrated in FIG. 20 is obtained.

In the optical system of FIG. 20, assume that a is a distance from the RGB-LED light sources to the microlens array (MLA), b is a distance from the microlens array to light transmitting parts, c is a size of the RGB-LED light sources (unit), and s is a size (a distance between points on which the lights are converged) of lights converged on the light transmitting parts. In this case, the following equation is satisfied:

$$b/a = s/c$$

In a case where the equation is modified by for example increasing the size of the RGB-LED light sources by c' so that the size is c+c', the size s' of the lights converged on the light transmitting parts is found by the following equation:

$$s' = b \times (c+c')/a$$

That is, the s' becomes larger than the s by b×c'/a.

In the Description, a corresponds to lx, b corresponds to ly, and c' corresponds to d which is an amount of movement of the plurality of light sources. Accordingly, in a case where the positions of the plurality of light sources are moved by d, an amount of movement of the positions, on which the lights are to be converged, becomes "ly×d/lx".

Figure 3:
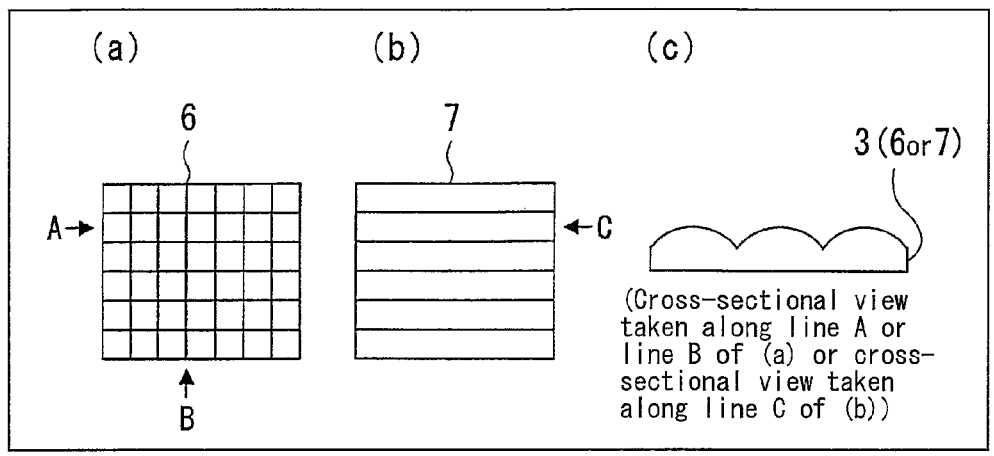
FIG. 3 is a view schematically illustrating a preferred example of an imaging optical system for use in the present invention.

A preferred embodiment of the microlens array 3 of the imaging optical system is for example (i) a fly-eye lens 6 having microlenses arranged in two directions orthogonal to each other, (ii) a lenticular lens 7 having micro cylindrical lenses arranged in a direction orthogonal to a longitudinal direction of each of the micro cylindrical lenses, or (iii) a combination of the fly-eye lens 6 and the lenticular lens 7 (see FIG. 3).

A preferred embodiment of the imaging optical system is the one configured such that each lens on a surface has a curvature radius of 0.5 mm through 2 mm. Since the curvature radius should vary depending on (i) a distance from a surface of the fly-eye lens to the light transmitting parts (liquid crystal layer), (ii) a refractive index, and (iii) a range of the liquid crystal layer where lights are to be converged, it is necessary that the each lens on the surface have a curvature most appropriate for (a) a size of the plurality of light sources to be used, (b) a liquid crystal panel, and (c) a target thickness of a backlight section. The each lens on the surface has a convex surface so as to achieve a light converging effect. The each lens can have the convex surface (I) on a side which faces the light transmitting parts or (II) on both sides. Note however that, in a case where the each lens has the convex surface on the side which faces the light transmitting parts, the imaging optical system cannot be attached to the light transmitting parts by for example an adhesive agent. Therefore, it is necessary to hold the transmitting parts and the image optical system so as to keep their positional relation. In view of this, the each lens on the surface of the imaging optical system more preferably has (A) the convex surface on a side which faces the irradiating optical system and (B) a flat surface on a side which faces the light transmitting parts.

For the purpose of spatially separating the lights most appropriately, the plurality of light sources can be arranged in a direction as below.

(A) In a case where the fly-eye lens 6 alone serves as the microlens array 3, the plurality of light sources are arranged in a direction (i.e., a direction A and a direction B in (a) of FIG. 3) orthogonal to either one of vertical and horizontal directions in which the microlenses are arranged.

(B) In a case where (i) the lenticular lens 7 alone or (ii) a combination of the lenticular lens 7 and the fly-eye lens 6 serves as the microlens array 3, the plurality of light sources are arranged in a direction (i.e., a direction C in (b) of FIG. 3) orthogonal to the longitudinal direction of each of the micro cylindrical lenses.

Figure 2:
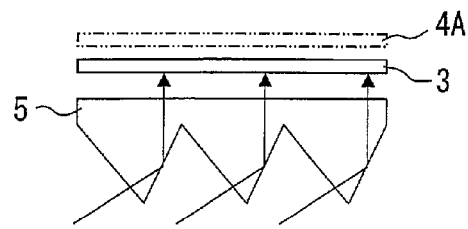
FIG. 2 is a view schematically illustrating a second example of the present invention.

Further, according to the present invention, the collimation reflection mirror 2, which serves as the irradiating optical system, can be replaced by a total reflection prism sheet 5 (see for example FIG. 2). According to this configuration, lights from the plurality of light sources are deflected by being totally reflected by the total reflection prism sheet 5 so that the lights travel toward the imaging optical system (microlens array) 3 at right angles to the imaging optical system 3.

The total reflection prism sheet 5 is inferior to the collimation reflection mirror 2 in terms of a function of deflecting the lights so that the lights travel in substantially parallel to a normal to the microlens array 3. Note, however, that the total reflection prism sheet 5 can achieve an effect equivalent to that of the collimation reflection mirror 2 provided that (i) lights emitted from the light sources 1 are controlled to be substantially parallel to a normal to the microlens array 3 and (ii) a distance from the light sources 1 to the total reflection prism sheet 5 is dramatically increased so that the lights emitted from the total reflection prism sheet 5 can be regarded as traveling in substantially parallel to the normal to the microlens array 3.

Further, the use of the total reflection prism sheet 5 can reduce production costs because the total reflection prism sheet 5 is not required to have a complicated and precise shape unlike the collimation reflection mirror 2.

Moreover, the total reflection prism sheet 5 is capable of deflecting lights by its prisms even in a case where chief rays from the light sources 1 strike the total reflection prism sheet 5 with angles of incidence of up to 88°. This makes it possible to dramatically reduce a distance from the light sources 1 to the light transmitting parts 4 in the system thickness direction (i.e., dramatically reduce a thickness of the backlight system). Note, however, that the light sources 1 are preferably configured such that distribution of lights from the light sources 1 is narrowed to some extent.

A preferred embodiment of the total reflection prism sheet 5 is as follows. That is, it is preferable that each prism of the total reflection prism sheet 5 have a vertex angle of 30° through 120°, and particularly preferably 60° through 90°. The total reflection prism sheet 5 is not limited to a particular thickness, but the thickness is preferably approximately 0.5 mm through 2 mm for the purpose of preventing the total reflection prism sheet 5 from warping.

The total reflection prism sheet 5 is made for example by metal molding, in which acrylic resin having a high transmittance, such as PMMA (polymethyl methacrylate), PS (polystyrene), PC (polycarbonate), or the like, is molded.

Figure 4:
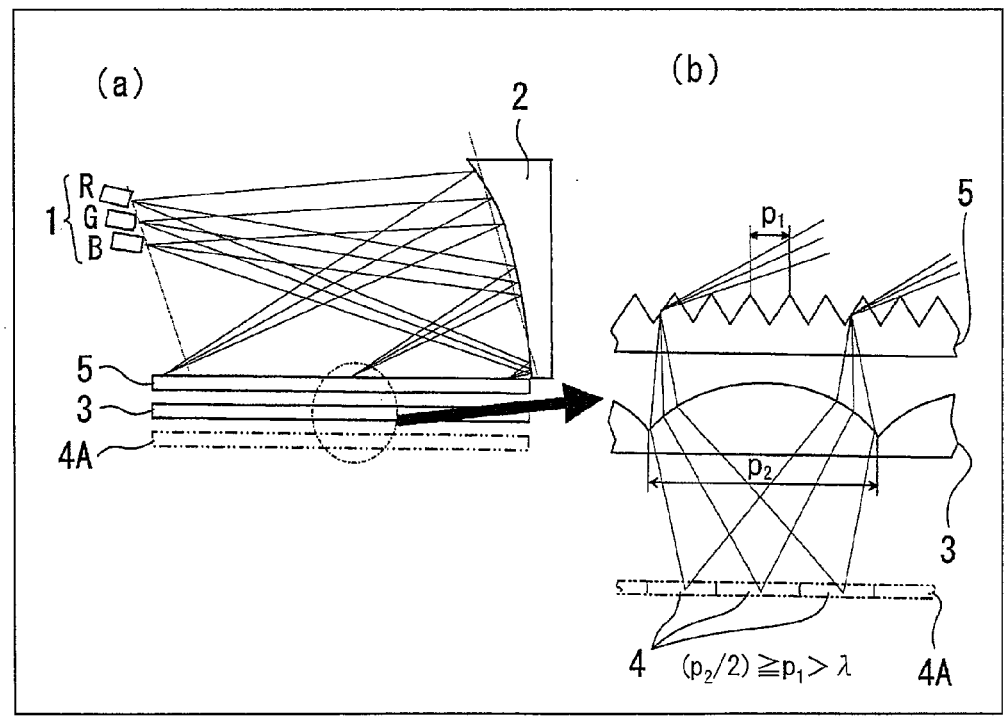
FIG. 4 is a view schematically illustrating a third example of the present invention.

Further, according to the present invention, the irradiating optical system can include a combination of the collimation reflection mirror 2 and the total reflection prism sheet 5 (see for example FIG. 4). Although this configuration causes an increase in production costs because the irradiating optical system includes two optical components, the configuration can achieve a compact backlight system in the following manner. That is, (i) a thickness of the backlight system is dramatically reduced because a distance from the light sources 1 to the array 4A of the light transmitting parts in the system thickness direction is reduced by the use of the total reflection prism sheet 5 while (ii) light paths from the light sources 1 to the total reflection prism sheet 5 are bent by the collimation reflection mirror 2. This makes it possible to reduce a distance from the light sources 1 to the total reflection prism sheet 5, thereby achieving a compact backlight system.

Note that, in a case where the irradiating optical system includes only the collimation reflection mirror 2, it is necessary to cause the collimation reflection mirror 2 to be subjected to position adjustment with respect to the light sources 1. On the other hand, in a case where the irradiating optical system includes the total reflection prism sheet 5, the position adjustment with respect to the light sources 1 is not necessary provided that a pitch $p_1$ at which a unit prism of the total reflection prism sheet 5 is repeated is (i) larger than a wavelength $\lambda$ of each of the lights from the light sources 1 and (ii) equal to or smaller than one-half a pitch $p_2$ at which the lenses of the image optical system are arranged (i.e., provided that an inequality $(p_2/2) \geq p_1 > \lambda$ is satisfied) (for example see (b) of FIG. 4). The reason therefor is as follows. The total reflection prism sheet 5 is configured such that unit prisms, which are uniform in the system width direction and have an identical shape in the system length direction, are arranged in the system length direction at a regular pitch. Therefore, even if the total reflection prism sheet 5 is not aligned in the system width direction and/or the system length direction, this does not at all affect how lights enter the imaging optical system (microlens array) 3.

The collimation reflection mirror 2 has a function of deflecting lights from positions of the light sources 1 so that the lights travel in parallel with one another. Therefore, displacement of the light sources 1 adversely affects a degree of how parallel the lights are. For the purpose of achieving a practical degree of how parallel the lights are, the light sources 1 need to be positioned with a tolerance of approximately several millimeters with respect to designed positions.

Figure 5:
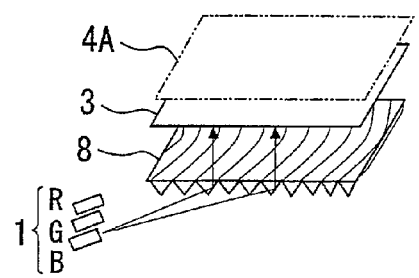
FIG. 5 is a view schematically illustrating a fourth example of the present invention.

Alternatively, according to the present invention, a total reflection Fresnel sheet 8 can serve as the irradiating optical system (see for example FIG. 5). According to this configuration, as is the case with the total reflection prism sheet 5, it is possible to dramatically reduce a distance from the light sources 1 to the light transmitting parts 4 in the system thickness direction (i.e., dramatically reduce a thickness of the backlight system). Note, however, that the light sources 1 are preferably configured such that distribution of lights from the light sources 1 is narrowed to some extent.

The use of the total reflection Fresnel sheet 8 makes it possible, without dramatically increasing a distance from the light sources 1 to the total reflection Fresnel sheet 8, to deflect the lights from the light sources 1 so that the lights travel in substantially parallel to a normal to the microlens array 3 as is the case with the collimation reflection mirror 2. This is different from the configuration in which the total reflection prism sheet 5 is used. Accordingly, in a case where the total reflection Fresnel sheet 8 alone serves as the irradiating optical system, it is possible to achieve an effect equivalent to that of the configuration in which a combination of the collimation reflection mirror 2 and the total reflection prism sheet 5 serves as the irradiating optical system. Note however that, as is the case with the collimation reflection mirror 2, the total reflection Fresnel sheet 8 needs to be subjected to relative position adjustment with respect to the light sources 1.

The total reflection Fresnel sheet 8 has a function of deflecting lights from positions of the light sources 1 so that the lights travel in parallel with one another. Therefore, displacement of the light sources 1 adversely affects a degree of how parallel the lights are. For the purpose of achieving a practical degree of how parallel the lights are, the light sources 1 need to be positioned with a tolerance of approximately several millimeters with respect to designed positions.

Further, according to the present invention, since the irradiating optical system and the imaging optical system can be integral with each other, it is possible to (i) reduce the number of optical components, (ii) reduce the number of operations of the position adjustment, and (iii) simplify the optical system. Such an integrated optical sheet includes a combination of for example (a) the total reflection prism sheet 5 or the total reflection Fresnel sheet 8, which serves as the irradiating optical system and (b) the fly-eye lens 6 or the lenticular lens 7, which serves as the imaging optical system.

Figure 6:
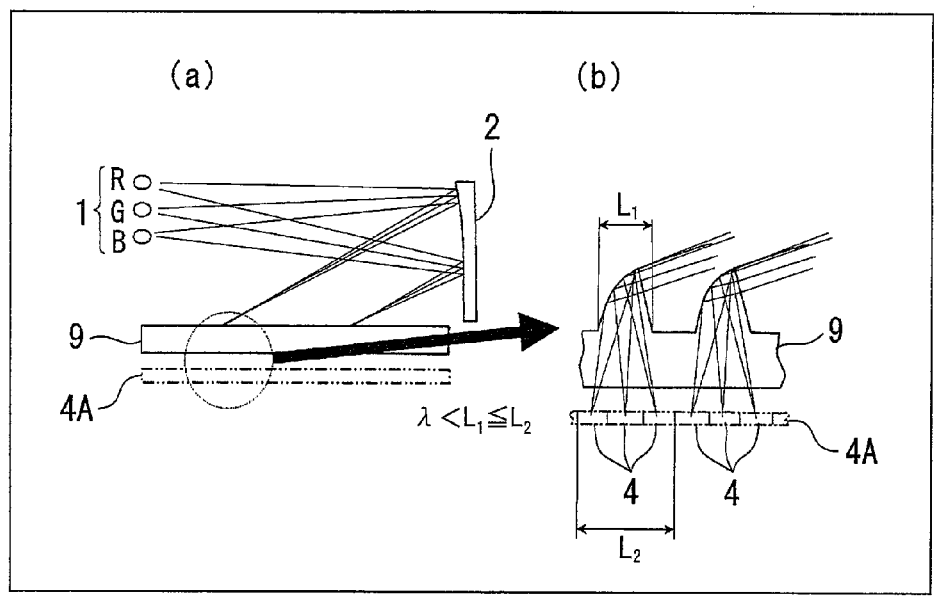
FIG. 6 is a view schematically illustrating a fifth example of the present invention.

For example, FIG. 6 illustrates an optical sheet 9 obtained by modifying the total reflection prism sheet 5 so that, out of two surfaces (a first surface from which a light enters and a second surface which totally reflects the light) of each prism, the second surface has a shape of a surface of a cylindrical lens instead of a flat surface. The second surface totally reflects a light so that the light is deflected and converged on a corresponding one of the light transmitting parts 4. Note that, although a combination of the optical sheet 9 (the second surfaces of the optical sheet 9) and the collimation reflection mirror 2 serves as the irradiating optical system according to the example of FIG. 6, the collimation reflection mirror 2 can be omitted.

Such a configuration, in which the irradiating optical system and the imaging optical system are integral with each other (for convenience of description, such a configuration is referred to as an integrated configuration) has the following advantages. That is, the advantages cannot be achieved by a configuration in which the irradiating optical system and the imaging optical system separate from each other (such a configuration is illustrated for example in FIGS. 1 through 5, and is, for convenience of description, referred to as a separated configuration).

<1> According to the separated configuration, each of the irradiating optical system and the imaging optical system needs to include at least one (1) optical component. In contrast, according to the integrated configuration, the optical sheet 9 alone can serve as both the irradiating optical system and the image optical system. This makes it possible to reduce the number of the optical components.

<2> According to the separated configuration, relative position adjustment is necessary for each of (i) the light sources 1 and the irradiating optical system, (ii) the light sources 1 and the imaging optical system, and (iii) the imaging optical system and the light transmitting parts 4 (note however that, in a case of using the total reflection prism sheet 5, relative position adjustment is not necessary for the light sources 1 and the irradiating optical system as described above). In contrast, according to the integrated configuration, the relative position adjustment is necessary only for (a) the light sources 1 and the optical sheet 9 and (b) the optical sheet 9 and the light transmitting parts 4. This makes it possible to reduce the number of operations of the position adjustment.

<3> Since the integrated configuration makes it possible to reduce the number of optical components as above, the integrated configuration makes it possible to simplify the optical system, thereby reducing the number of man-hours for an assembling process and an operation process. Further, the integrated configuration is a simpler configuration. This eventually makes it possible to reduce a weight of the entire system and to reduce costs.

The integrated optical sheet 9 is made for example by metal molding, in which acrylic resin such as PMMA (polymethyl methacrylate), PS (polystyrene), PC (polycarbonate), or the like, is molded.

Meanwhile, according to the integrated optical sheet 9 exemplified in FIG. 6, each of the second surfaces of the imaging optical system for converging lights on the light transmitting parts 4 (i.e., the array 4A of the light transmitting parts 4) serves as a total reflection surface of the irradiating optical system. In view of this, each unit lens of the integrated optical sheet 9 preferably has the following size so as to cause the irradiating optical system to correspond to the light transmitting parts 4. That is, each unit lens preferably has a size L1 that is (i) larger than a wavelength λ of each of the lights from the light sources 1 and (ii) equal to or smaller than a length L2 which is found by multiplying a pitch at the light transmitting parts 4 are arranged by the number of types (the number is three in the present embodiment) of the different dominant wavelengths (that is, it is preferable that an inequality of $\lambda < L1 \leq L2$ be satisfied) (see (b) of FIG. 6).

The reason therefor is as follows. If L1 is larger than L2, then a converged light would be larger than one (1) light transmitting part. Further, the converged light would be repeated at a pitch larger than one (1) light transmitting part. If this is the case, it is difficult to converge lights on all of target ones of the light transmitting parts 4.

Figure 7:
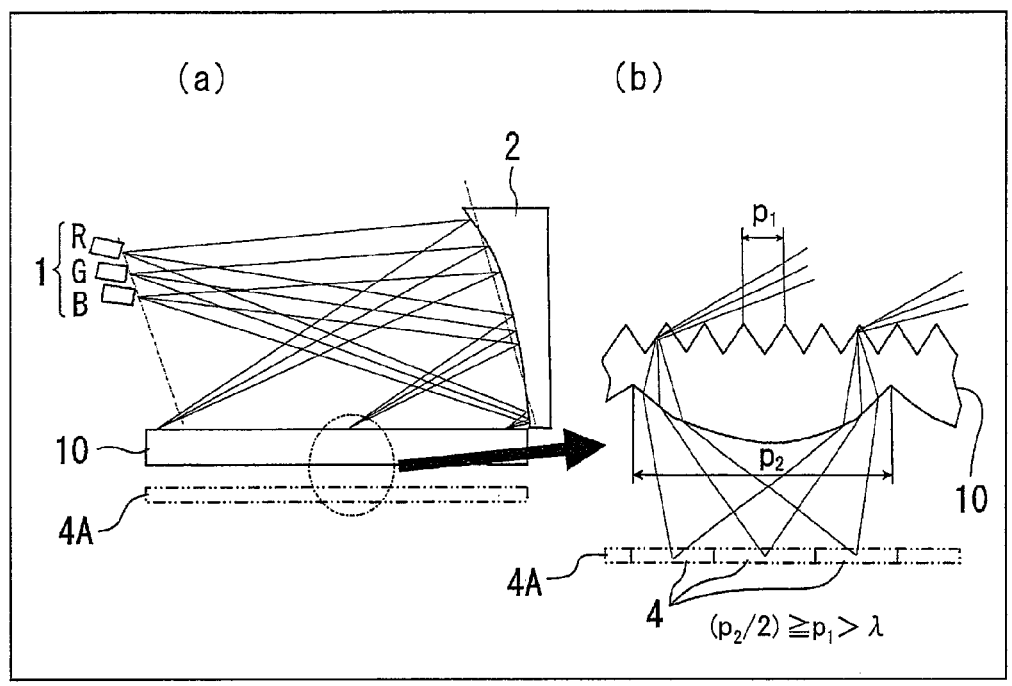
FIG. 7 is a view schematically illustrating a sixth example of the present invention.

Further, FIG. 7 illustrates an optical sheet 10 which has (i) a first surface serving as a total reflection prism sheet of the irradiating optical system, from which first surface lights enter the optical sheet 10 and (ii) a second surface serving as a lenticular lens of the imaging optical system, through which second surface the lights are emitted from the optical sheet 10. The optical sheet 10 of FIG. 7 can be modified such that (a) the first surface serves as a total reflection Fresnel sheet instead of the total reflection prism sheet and/or (b) the second surface serves as a fly-eye lens instead of the lenticular lens. Note that, in a case where the first surface serves as the total reflection Fresnel sheet, the collimation reflection mirror 2 is not necessary.

The optical sheet 10 of FIG. 7 has an integrated configuration in which the irradiating optical system is on the first surface and the imaging optical system is on the second surface. On the other hand, the optical sheet 9 of FIG. 6 has an integrated configuration in which the irradiating optical system and the imaging optical system are on a first surface from which lights enter the optical sheet 9. From a viewpoint of easy production, the optical sheet 10 of FIG. 7 would be advantageous as compared to the optical sheet 9 of FIG. 6, because the optical sheet 10 is easier to produce because of its relatively-simple configuration of sheet surfaces.

The integrated optical sheet 10 of FIG. 7 is preferable for the following reason. That is, the optical sheet 10 of FIG. 7 is optically equivalent to a separated configuration shown in FIG. 4, in which configuration a totally flattened surface of the irradiating optical system 5 is bonded with a totally flattened surface of the imaging optical system 3. Accordingly, as is the case with (b) of FIG. 4, position adjustment is not necessary for the optical sheet 10 with respect to the light sources 1 provided that the first and second surfaces of the optical sheet 10 are configured so as to satisfy an inequality of $\lambda < p_1 \leq (p_2/2)$ (see (b) of FIG. 7).

The following description discusses a preferable embodiment of the optical sheet 10. The following description separately discusses each of (i) the irradiating optical system on the first surface and (ii) the imaging optical system on the second surface.

A preferred embodiment of the irradiating optical system on the first surface is the one including a total reflection prism sheet. The reason therefor is as follows. That is, with the total reflection prism sheet, position adjustment is not necessary for the light sources 1 and the optical sheet 10 provided that a pitch at which a prism is repeated satisfies the earlier-described condition.

Each prism preferably has a vertex angle of 30° through 120°, and more preferably 60° through 90°. Although the each prism is not limited to a particular thickness, the thickness of the each prism is preferably approximately 0.5 mm through 2 mm for the purpose of preventing the sheet from warping.

On the other hand, a preferred embodiment of the imaging optical system on the second surface is the one including a fly-eye lens. The reason therefor is as follows. That is, with the fly-eye lens, it is possible to converge, on a corresponding picture element in a liquid crystal, each of lights in a form of a point by causing the lights to pass through the fly-eye lens. This makes it possible to prevent the lights from being blocked by metal wires for driving the liquid crystal. In contrast, with a lenticular lens, each of lights having passed through the lenticular lens is converged in a form of a line on a corresponding picture element in the liquid crystal. This causes part of the lights to be blocked by source lines or gate lines, thereby causing a loss of light.

The following description discusses a preferred embodiment of the fly-eye lens on the second surface. According to the preferred embodiment of the fly-eye lens, each lens has a curvature radius of 0.5 mm through 2 mm. Since the curvature radius should vary depending on (i) a distance from a surface of the fly-eye lens to the light transmitting parts (liquid crystal layer), (ii) a refractive index, and (iii) a range of the liquid crystal layer where lights are to be converged, it is necessary that the each lens of the fly-eye lens on the second surface have a curvature most appropriate for (a) a size of the plurality of light sources to be used, (b) a liquid crystal panel, and (b) a target thickness of a backlight section.

Since the light sources 1 for use in the present invention are a plurality of light sources that emit lights having different dominant wavelengths, the light sources 1 are preferably LED (light emitting diode) light sources, laser light sources, or organic EL (electroluminescence) light sources. The number of the light sources 1 does not necessarily have to be the same as the number of types of dominant wavelengths. Therefore, several light sources can correspond to each of the different dominant wavelengths. Note here that, for the purpose of reducing performance variations among the light sources 1 which variations result from production variations, it is rather preferable that the several light sources correspond to each of the different dominant wavelengths.

Examples of each of the LED light sources encompass (i) an LED light source including for example a bullet-shaped LED in which a condensing lens (e.g., a lens made from spherical acrylic) is provided on a light emitting surface (a light emitting chip) of an LED, (ii) an LED light source including for example a mounted LED including no condensing lens, and the like. Each of the LED light sources can include any of the LEDs described above.

Note here that, according to the present invention, the light emitting section including the light sources 1 can be replaced by a light emitting device (see FIG. 21) including the light sources 1 and light guides 14. With such a light emitting device, it is possible to dramatically reduce costs because the number of light sources is reduced. The light emitting device is described below in detail.

Figure 21:
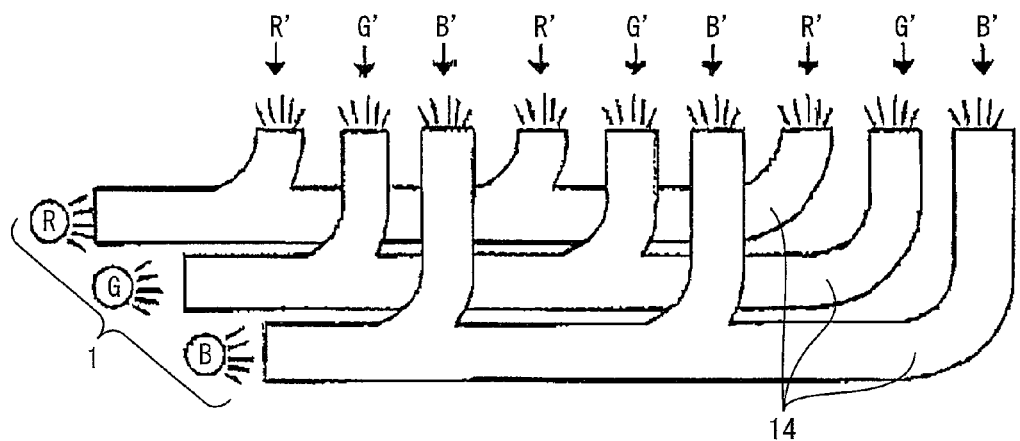
FIG. 21 is a view schematically illustrating one example of a light emitting section in accordance with the present invention.

As illustrated in FIG. 21, the light emitting device for use in the present invention includes the light guides 14 for guiding lights, which are from the light sources 1, to a plurality of ends of the light guides 14 so that the lights are emitted outward. The ends are regarded as pseudo-light sources. For example, as illustrated in FIG. 21, lights from one (1) RGB light source 1 are guided into respective three backlight units (light guides). The backlight units (light guides) make respective pseudo-light sources of R', G', and B'. Lights emitted from the pseudo-light sources of R', G', and B' are converged on the light transmitting parts 4 through the imaging optical system 3, thereby achieving an effect equivalent to that achieved by light sources of R, G, and B.

Further, in a case where the thin backlight system in accordance with the present invention is used as a backlight of a liquid crystal display device, the thin backlight system converges lights of R, G, and B on picture elements, of the liquid crystal display device, which serve as the light transmitting parts. This makes it possible to reduce a light loss, because a color filter layer absorbs less light. In order to further reduce a light loss caused by absorption by a polarizer of the liquid crystal display device, it is preferable to provide, on an optical path from the light sources 1 to the imaging optical system 3, an element (element for separating polarized lights) 11 for transmitting a light polarized in a specified direction and reflecting the other lights (for example, see (a) of FIG. 8). Examples of such an element for separating polarized lights encompass a wire grid polarizer.

Further, addition of an optical element (e.g., λ/2 plate) makes it possible to further reduce a light loss caused by absorption by the polarizer in the following manner. That is, such an optical element (i) causes both a first light passing through the element 11 and a second light reflected by the element 11 to travel toward the imaging optical system and (ii) causes the second light to be polarized in a direction identical to that of the first light. This makes it possible to irradiate the imaging optical system with lights polarized in an identical direction, thereby reducing a light loss caused by absorption by the polarizer.

Figure 8:
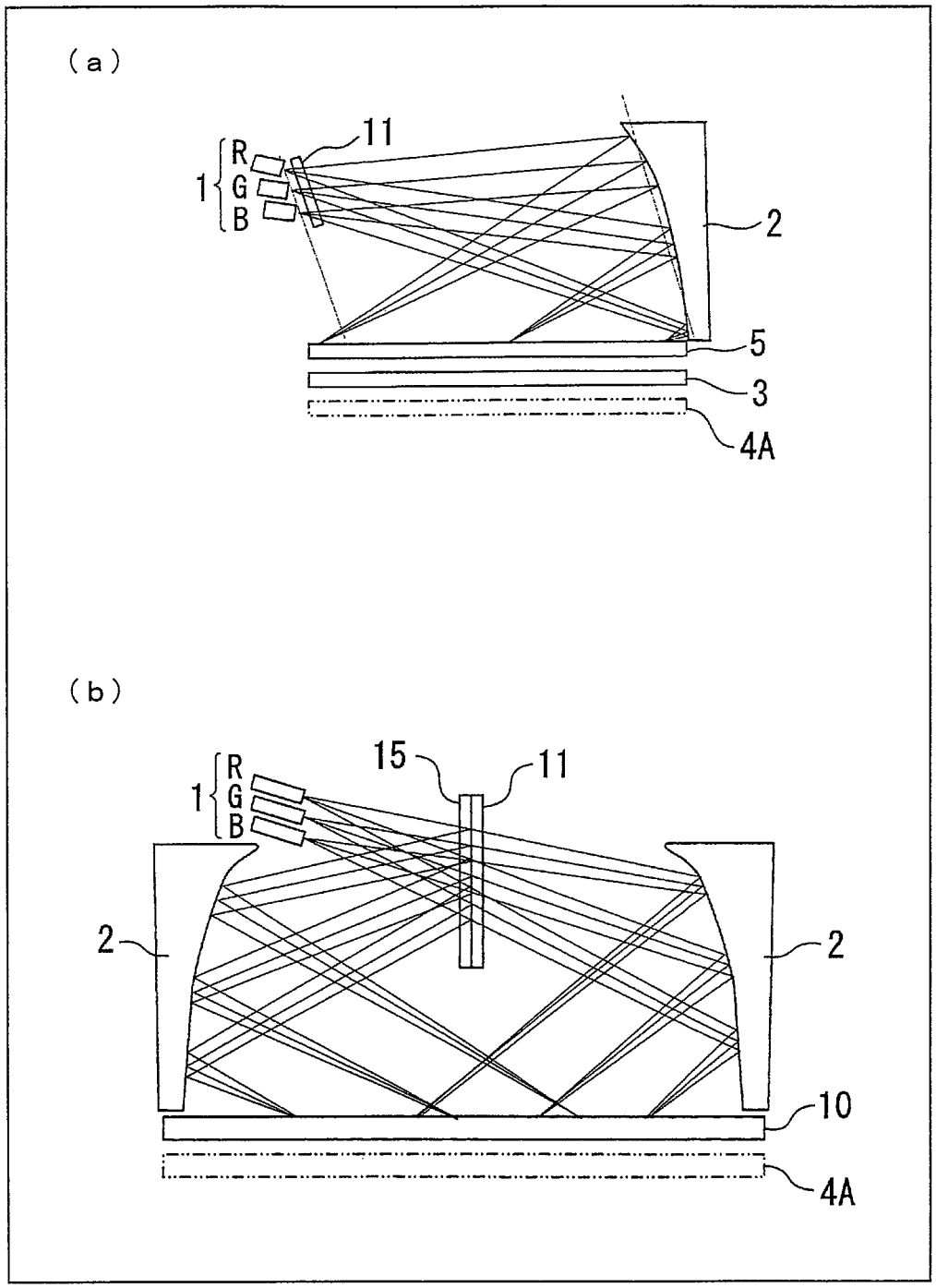
FIG. 8 is a view schematically illustrating a seventh example of the present invention.

(b) of FIG. 8 illustrates one example of such a configuration. The element 11 for separating polarized lights and a λ/2 plate 15 are provided between the light sources 1 and the collimation reflection mirror 2. In a case where polarized lights passing through the element 11 are referred to as polarized lights P and lights reflected by the element 11 are referred to as polarized lights S, the polarized lights P, which have passed through the λ/2 plate 15 and the element 11, are reflected by the collimation reflection mirror 2 so as to travel toward the optical sheet 10 such that the lights are in substantially parallel with each other. On the other hand, the polarized lights S, which have been reflected by the element 11, are converted into polarized lights P by the λ/2 plate 15 immediately after the reflection. Then, the lights P thus converted are reflected by the collimation reflection mirror 2 so as to travel toward the optical sheet 10 such that the lights are in substantially parallel with each other. As a result, the optical sheet 10 is irradiated only with the polarized lights P. Under such circumstances, a light loss caused by absorption by the polarizer is prevented by causing the liquid crystal display device to have a polarizer which transmits the polarized lights P, which liquid crystal display device includes the picture elements serving as the light transmitting parts of the array 4A. Note that the optical sheet 10 can be replaced by (i) the optical sheet 9 or (ii) a combination of an irradiating optical system and an imaging optical system separate from each other.

Meanwhile, according to the thin backlight system as described so far, an increase in a size of an area irradiated by one (1) backlight system leads to an increase in a distance from the light sources 1 to the light transmitting parts 4. That is, by reducing the size of the area irradiated by one (1) backlight system and causing one (1) liquid crystal display panel to be irradiated by a plurality of backlight systems, it is possible to reduce a thickness of the backlight systems, thereby achieving a further thin backlight system.

Figure 9:
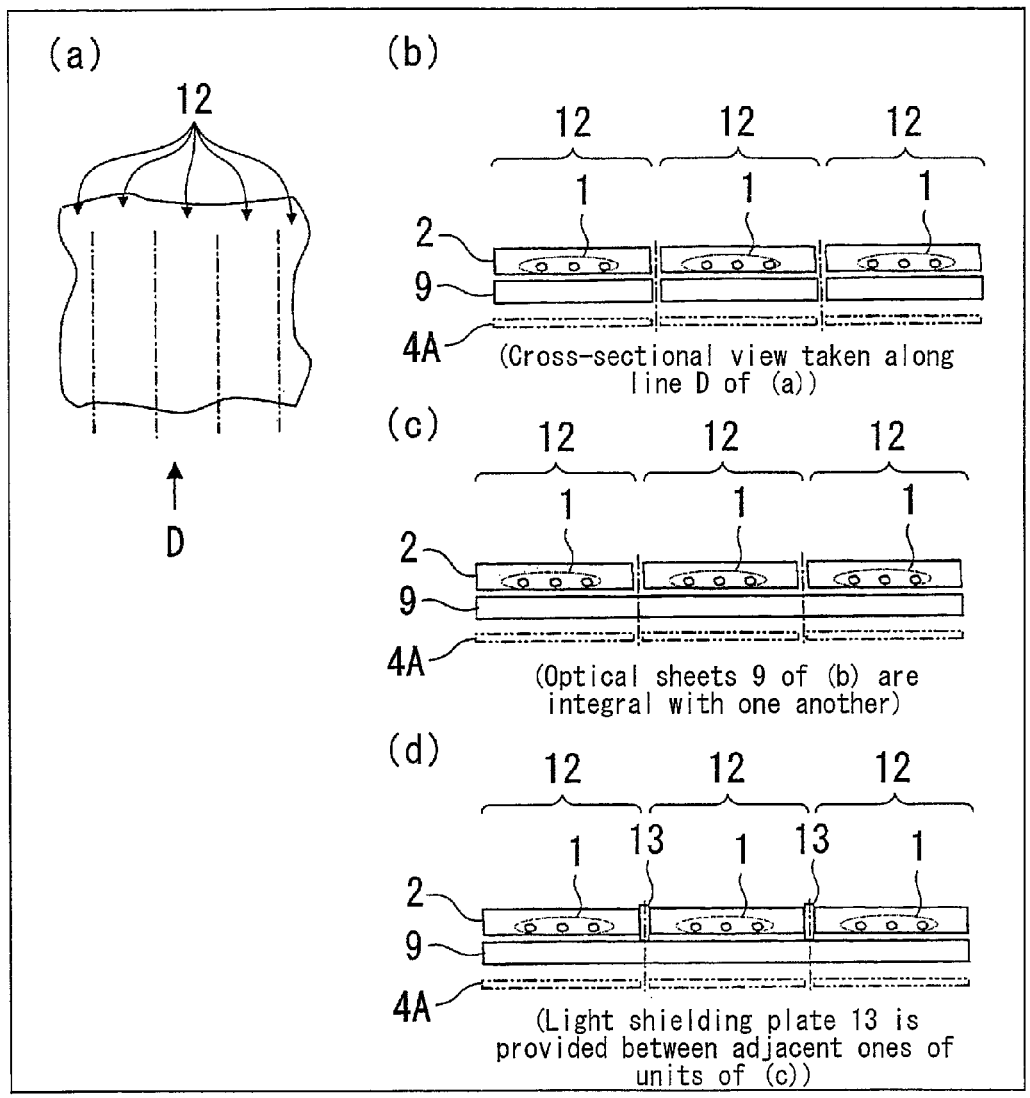
FIG. 9 is a view schematically illustrating an eighth example of the present invention.

This is achieved by (i) causing a thin backlight system to serve as one (1) backlight unit 12 and (ii) arranging a plurality of backlight units 12 in parallel with each other (for example, see FIG. 9). Note however that, since an increase in the number of the backlight units relative to one (1) liquid crystal panel leads to an increase in the number of constituents and thus leads to an increase in production costs, the thickness and the production costs are in a trade-off relationship. Note that, according to FIG. 9, the arrays 4A of light transmitting parts are provided separately for the respective plurality of backlight units 12; however, according to the liquid crystal panel in which the light transmitting parts serve as the picture elements, the arrays 4A of the light transmitting parts are not separated for the respective plurality of backlight units 12 but are integral with each other so as to be a liquid crystal layer corresponding to the entire plurality of backlight units 12.

The thin backlight system in accordance with the present invention preferably includes, for the purpose of easily changing luminance in each of different portions of the liquid crystal panel, means (not illustrated) for controlling an amount of light emitted from the light sources 1. The means is provided for each of the backlight units or for every two or more of the plurality of backlight units.

Note that, although each of the plurality of backlight units 12 of the example of FIG. 9 is the thin backlight system of FIG. 6, the each of the plurality of backlight system 12 is not limited to this. Therefore, any of the thin backlight systems of FIGS. 1 though 5, 7, and 8 can be used as the each of the backlight units.

Further, for the purpose of reducing production costs and the number of position adjustment processes, the configuration in which the plurality of backlight units are arranged in parallel with each other is preferably configured as below. That is, at least one type of optical components used as constituents of two or more of the plurality of backlight units, i.e., at least one type of (i) the above-described collimation reflection mirrors 2, (ii) the total reflection prism sheets 5, (iii) the total reflection Fresnel sheets 8, (iv) the optical sheets 9, (v) the optical sheets 10, (vi) the fly-eye lenses 6, and (vii) the lenticular lenses 7, of two or more of the plurality of backlight units, are preferably not separated for the respective two or more of the plurality of backlight units but are integral with each other to correspond to the two or more of the plurality of backlight units. (c) of FIG. 9 illustrates a configuration in which the optical sheets 9 are integral with each other so as to correspond to the plurality of backlight units 12.

An ideal embodiment of the thin backlight system of FIG. 9 is the one in which such optical components are integral with each other so as to have a size same as that of the liquid crystal panel. Note however that, in real production, a size of the optical components integrated can be determined as appropriate depending on production costs, the number of assembly processes, and the like.

Moreover, according to the thin backlight system of FIG. 9, the following occurs for example in a case of a configuration including the collimation reflection mirror 2. That is, if a light (e.g., a light of R) emitted from a light source of one (assume that the one is a unit U1) of the plurality of backlight units strikes the collimation reflection mirror 2 of an adjacent unit (assume that the adjacent unit is a unit U2) and is reflected by the collimation reflection mirror 2, the light largely deviates from a direction (i.e., a direction in which the collimation reflection mirror 2 of the unit U2 deflects a light) in which lights travel in substantially parallel with each other. Such a light deviated from the direction becomes a stray light, and eventually reaches a light transmitting part for a light (e.g., a light of G or a light of B) having a different dominant wavelength. This causes a reduction in image quality.

In order to solve the problem, it is preferable to provide, between adjacent ones of the plurality of backlight units 12 arranged in parallel with each other, means (a light shielding plate) 13 for preventing a light emitted from a light source 1 of one of the adjacent ones of the plurality of backlight units 12 from entering the other one of the adjacent ones of the backlight units 12 (for example, see (d) of FIG. 9).

Figure 10:
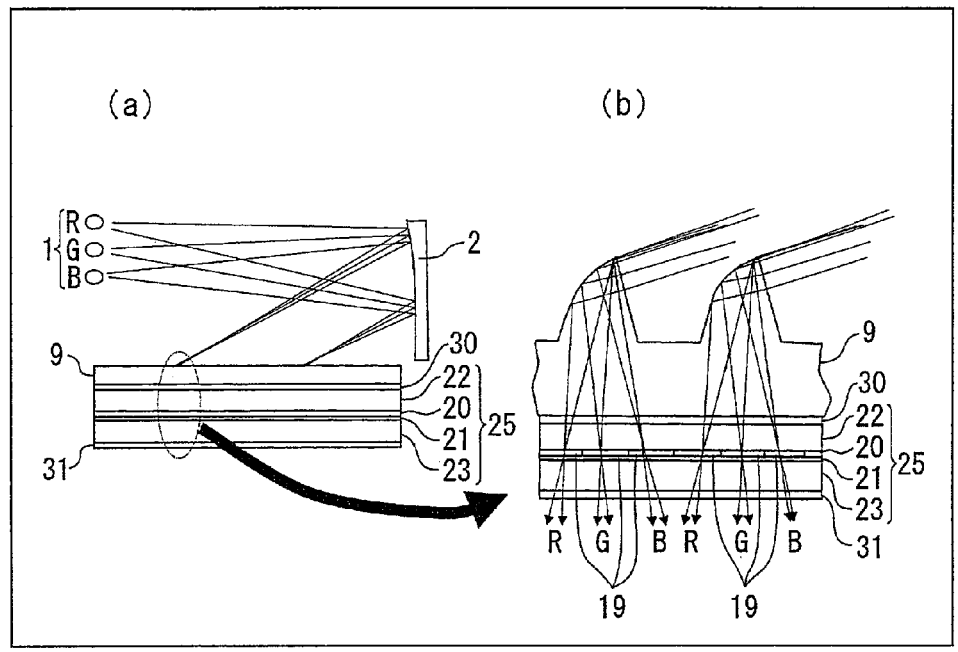
FIG. 10 is a view schematically illustrating a ninth example of the present invention.

The following description discusses a liquid crystal display device in accordance with the present invention. The liquid crystal display device in accordance with the present invention is a liquid crystal display device including any one of the foregoing thin backlight systems. FIG. 10 illustrates an example of the liquid crystal display device in accordance with the present invention. Specifically, the liquid crystal display device in accordance with the present invention includes: a liquid crystal element 25; a drive element 21 which drives the liquid crystal element 25; a polarizer 30; and an analyzer 31. The liquid crystal element 25 includes a liquid crystal layer 20 sandwiched between glass substrates 22 and 23, in which liquid crystal layer 20 picture elements 19 serving as the light transmitting parts are arranged. The glass substrate 22 is on a first side from which a light enters, while the glass substrate 23 is on a second side from which the light is emitted. The polarizer 30 and the analyzer 31 are provided on the glass substrate 22 and the glass substrate 23, respectively. On each of the picture elements 19, a corresponding one of lights (in this example, lights of R, G, and B), which have different dominant wavelengths and are emitted from an imaging optical system (in this example, the optical sheet 9) of the thin backlight system, is converged so as to pass through the each of the picture elements 19.

Since the liquid crystal display device in accordance with the present invention is configured such that lights from the light sources 1 are converged on the picture elements 19 of the liquid crystal layer 20, the lights having passed through the liquid crystal layer 20 and coming out of the analyzer 31 are directed to the front to some extent. Therefore, when a screen of the liquid crystal display device is viewed from a direction other than the front direction (i.e., observed from an oblique direction), those displayed on the screen may not be recognized very well because little light is received or may not be recognized at all because no light is received. In order to solve the problem, it is preferable to further provide a diffusing plate 40 on a surface, of the analyzer 31, which is on the second side (for example, see FIG. 11).

Figure 11:
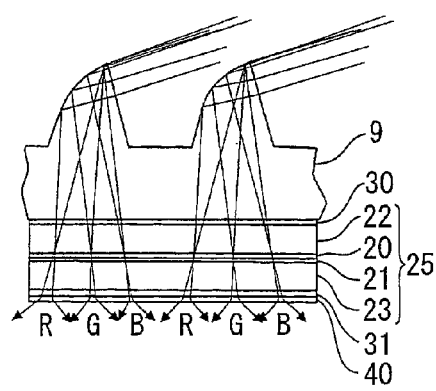
FIG. 11 is a view schematically illustrating a tenth example of the present invention.
Figure 12:
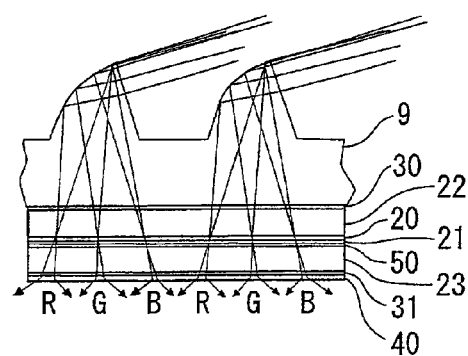
FIG. 12 is a view schematically illustrating an eleventh example of the present invention.

Meanwhile, according to the liquid crystal display device of FIG. 11, there is the glass substrate 23 between the liquid crystal layer 20 and the analyzer 31. Therefore, depending on a thickness of the glass substrate 23, lights having passed adjacent ones of the picture elements 19 may overlap each other on the analyzer 31. The lights overlapping each other may be diffused by the diffusing plate 40, thereby causing a reduction in image quality.

In order to avoid such a situation, the liquid crystal display device of FIG. 11 are preferably configured such that their including components are stacked in order of "the liquid crystal layer 20, the drive element 21, the analyzer 31, the diffusing plate 40, and the glass substrate 23", instead of order of "the liquid crystal layer 20, the drive element 21, the glass substrate 23, the analyzer 31, and the diffusing plate 40", from the liquid crystal layer 20 toward the second side.

Further, in a case where the diffusing plate 40 is a diffusing element (e.g., an element for diffusing a light by totally reflecting the light at a border between regions with different refractive indices) which has a function of keeping a polarized state, the liquid crystal display device can be configured such that the diffusing element is provided between the drive element 21 and the glass substrate 23. This achieves an effect equivalent to that of the foregoing configuration.

Further, the liquid crystal display device of FIG. 11 can be configured such that their including components are stacked in order of "the liquid crystal layer 20, the drive element 21, the diffusing element, the analyzer 31, and the glass substrate 23", instead of order of "the liquid crystal layer 20, the drive element 21, the diffusing element, the glass substrate 23, and the analyzer 31", from the liquid crystal layer 20 toward the second side. This achieves an effect equivalent to that of the foregoing configuration.

The liquid crystal display device in accordance with the present invention is produced through (i) a process of producing optical components for use and (ii) a process of assembling the optical components. Note, however, that there may be problems in which for example (a) it is difficult to produce the optical components as designed due to production variation, (b) it is difficult to assemble the optical components due to production variation, or (c) it is necessary to produce optical components deviating from their designs to some extent for reasons of production costs. In that case, it may be difficult to converge, on each of the picture elements (i.e., light transmitting parts) of the liquid crystal layer, only a light corresponding to the each of the picture elements. This may eventually cause a reduction in display quality if the worst happens. In order to avoid such a situation, the present invention does not exclude provision of a color filter layer. That is, the liquid crystal display device can be configured such that a color filter layer 50 is further provided on a surface, of the glass substrate 23, which is on the first side (for example, see FIG. 12). Note, however, that the color filter layer transmits approximately 90% of a light even in a case of a light having a wavelength that color filter layer can transmit. That is, it is difficult to avoid a loss of light. For this reason, it is preferable not to provide the color filter layer.

Figure 13:
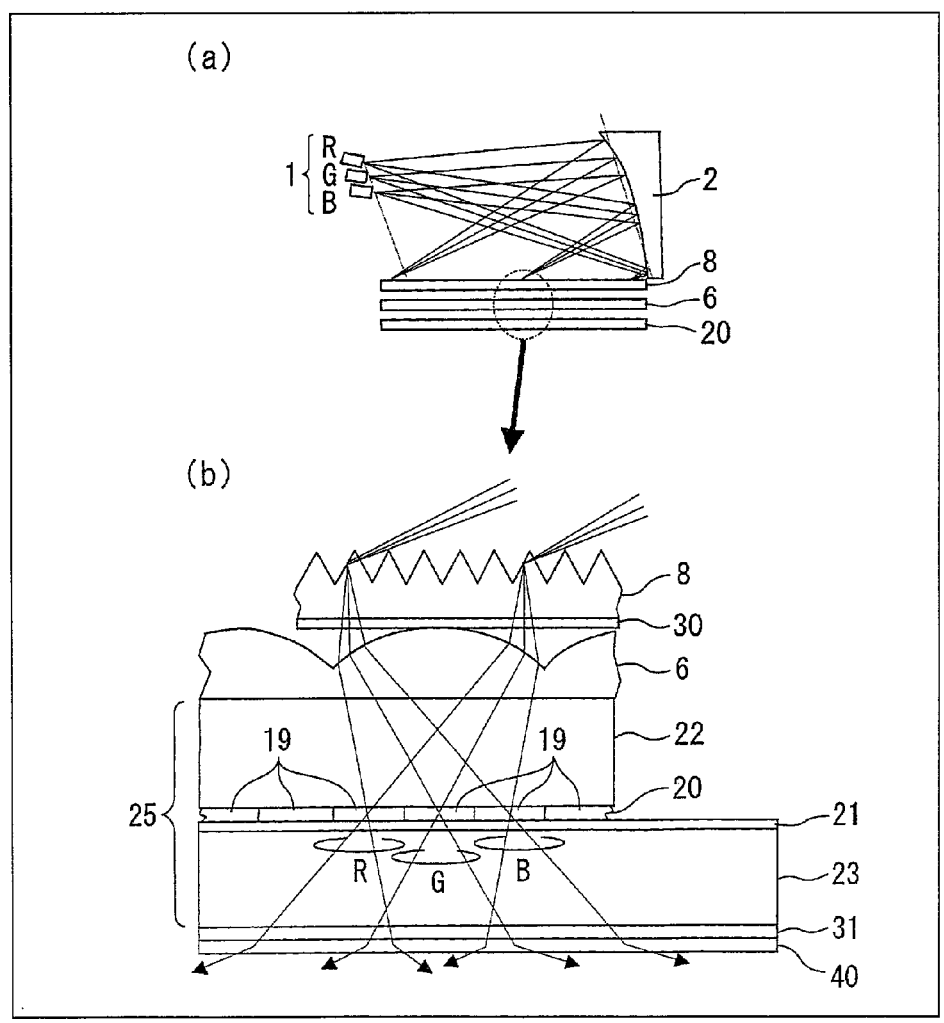
FIG. 13 is a view schematically illustrating a twelfth example of the present invention.

Further, according to the present invention, the liquid crystal display device can be configured such that the imaging optical system of the thin backlight system is provided between the polarizer and the glass substrate on the first side. FIG. 13 illustrates one example of such a configuration, in which the fly-eye lens 6, which is included in the thin backlight system including the total reflection Fresnel sheet 8 and the fly-eye lens 6, is provided between the polarizer 30 and the glass substrate 22. According to this configuration, it is possible to produce the imaging optical system during a process of producing the liquid crystal element, which process includes a process of position adjustment with respect to the liquid crystal element 25. This achieves an advantage that position adjustment with respect to the liquid crystal display device (liquid crystal panel) is not necessary, which adjustment is needed after production in a case where the imaging optical system is produced in a different process from that of the liquid crystal element.

The following description discusses a process of forming the fly-eye lens 6 on the glass substrate in a method for producing the liquid crystal display device configured like above.

First, resin that causes ultraviolet curing is applied to a glass substrate by a spin coating method or a dipping method etc. Next, light shielding masks are arranged in a virtual plane, which is above the surface to which the resin is applied and which faces the surface at a predetermined interval such that the plane and the surface are in parallel with each other. Note here that the light shielding masks are preferably arranged such that areas on which lenses of the fly-eye lens 6 are to be formed are irradiated with ultraviolet rays through openings. Further, the light shielding masks are preferably placed between a light source for exposure and the glass substrate. Since the light source for exposure emits ultraviolet rays toward the light shielding masks thus placed, parts of the resin applied to the glass substrate are exposed to the ultraviolet rays. Next, unexposed parts of the resin are developed and removed, thereby forming the fly-eye lens 6.

Note that the lenticular lens 7 can be used instead of the fly-eye lens 6. The lenticular lens 7 can be formed through processes same as those of the fly-eye lens 6.

The resin that causes ultraviolet curing is preferably the one does not affect a polarized state of a light. The reason therefor is as follows. That is, providing the resin on the glass substrate means that there is an imaging optical system between the polarizer and the analyzer. Under such circumstances, if the polarized state of the light is changed by the imaging optical system, image quality may be reduced.

Note that, according to the liquid crystal display device, stack positions of the liquid crystal layer and the drive element can be exchanged. This does not affect display performance. For this reason, the present invention encompasses also a liquid crystal display device in which stack positions of the liquid crystal display element and the drive element are exchanged.

EXAMPLES

The following description discusses, with examples and comparative examples, results of concrete studies into effects of the present invention. Note, however, that the present invention is not limited to the examples described as below.

A thin backlight system configured as illustrated in FIG. 2, which backlight system serves as an example of the present invention, was experimentally produced. The thin backlight system includes point light sources 1 constituted by (i) an LED that emits a light having a dominant wavelength of R, (ii) an LED that emits a light having a dominant wavelength of G, and (iii) an LED that emits a light having a dominant wavelength of B. The point light sources 1 were lit, and spatial luminance distribution of lights emitted from top surfaces of microlenses was measured with use of a luminance and chromaticity uniformity measuring device (manufactured by TOPCON TECHNOHOUSE CORPORATION, UA-1000). The LED of R, G, and B of the point light sources 1 were bullet-shaped LEDs, and were arranged so that (a) longitudinal axes of the respective bullet-shaped LEDs were aligned in an identical plane, (b) a direction in which the bullet-shaped LEDs were aligned is in parallel to a system width direction, and (c) the longitudinal axes obliquely intersect a direction in which prisms of a total reflection prism sheet 5 were arranged.

The total reflection prism sheet 5 was made from acrylic resin (refractive index: approximately 1.5), and configured such that (i) a thickness was approximately 150 μm and (ii) each prism of the total reflection prism sheet 5 had a vertex angle of 90°, was approximately 50 μm in width, and was smaller than each of the top surfaces of the microlenses.

The microlens array 3 was made from glass (manufactured by SCHOTTO, B270, refractive index=approximately 1.52), and configured such that (i) a thickness was 2.5 mm and (ii) each of the microlenses of the microlens array 3 had a focal length of approximately 1.8 mm and was approximately 600 μm in width.

The present example was based on the assumption that light transmitting parts 4 were arranged such that (i) each of light transmitting parts corresponding to respective dominant wavelengths of R, G, and B was approximately 200 μm in width and (ii) a group of the light transmitting parts, which group including the light transmitting parts corresponding to the respective dominant wavelengths of R, G, and B, was repeated at a pitch of approximately 600 μm. Note however that, in measuring spatial luminance distribution, a diffusing sheet was provided in a position where the light transmitting parts 4 were supposed to be provided. The diffusing sheet was provided above a surface, of the microlens array 3, from which light is emitted.

Under such circumstances, each of the point light sources 1 was caused to emit a light toward the total reflection prism sheet 5 at approximately 75° to a normal to the total reflection prism sheet 5. Note here that a distance from the each of the point light sources 1 to the total reflection prism sheet 5 in a system thickness direction was approximately 25 mm. Further, since the total reflection prism sheet 5 and the microlens array 3 were in close contact with each other with an air interface therebetween, a total distance from the point light sources to the light transmitting parts was approximately 28 mm.

On the other hand, a surface light source, which serves as a comparative example of the present invention, was experimentally made by replacing the total reflection prism sheet 5 of the example of the present invention by a refracting Fresnel sheet. The surface light source was different from the example of the present invention only in that the point light sources 1 were moved so that a distance from the point light sources 1 to the refracting Fresnel sheet in the system thickness direction was 60 mm. Then, spatial luminance distribution was measured by a method same as that of the example of the present invention.

For the purpose of clearly demonstrating a difference between the example and the comparative example of the present invention, the spatial luminance distribution was measured from a position which deviates by approximately 30 mm in the system width direction from a center of an area irradiated by each of the point light sources 1.

Figure 14:
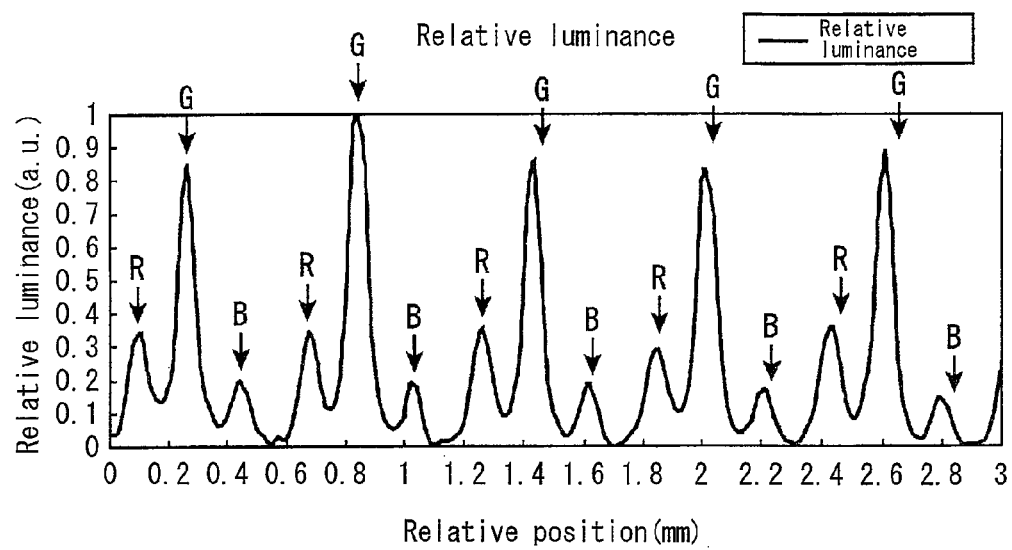
FIG. 14, showing an example of the present invention, is a graph illustrating a measurement result of luminance.

FIG. 14 shows a result of the example of the present invention. FIG. 14 is a graph illustrating measurement results obtained with use of the measurement device and averaged in an entire area in the system length direction. As illustrated in FIG. 14, lights having dominant wavelengths of R, G, and B emitted from the LEDs were converged on respective different positions at intervals of approximately 200 µm. This indicates that the light transmitting parts corresponding to the respective LEDs of R, G, and B transmit only lights emitted from their respective corresponding LEDs. Note that maximum luminance values of the respective R, G, and B were different from one another because relative luminosity curves of the respective R, G, and B were different from one another.

Figure 15:
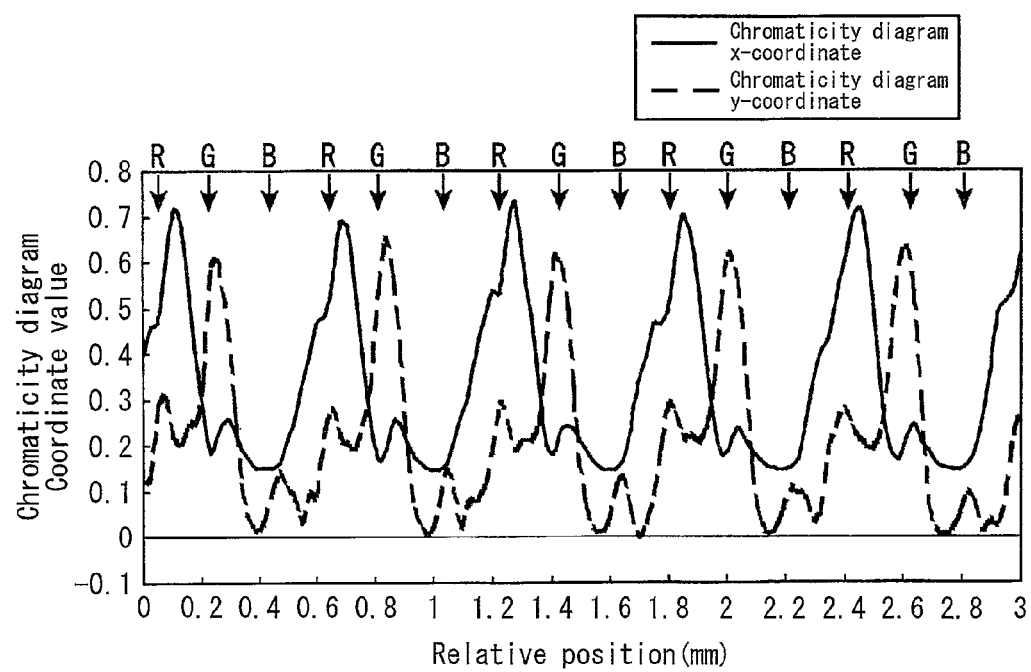
FIG. 15, showing the example of the present invention, is a graph illustrating spatial distribution of chromaticity coordinates.

FIG. 15 more specifically illustrates the results. FIG. 15 shows spatial distribution of chromaticity coordinates. As is clear from FIG. 15, chromaticity coordinates indicated coordinates of R, G, and B and were distributed at intervals of approximately 200 µm. This demonstrated that the lights having the dominant wavelengths of R, G, and B were converged separately from one another.

Figure 16:
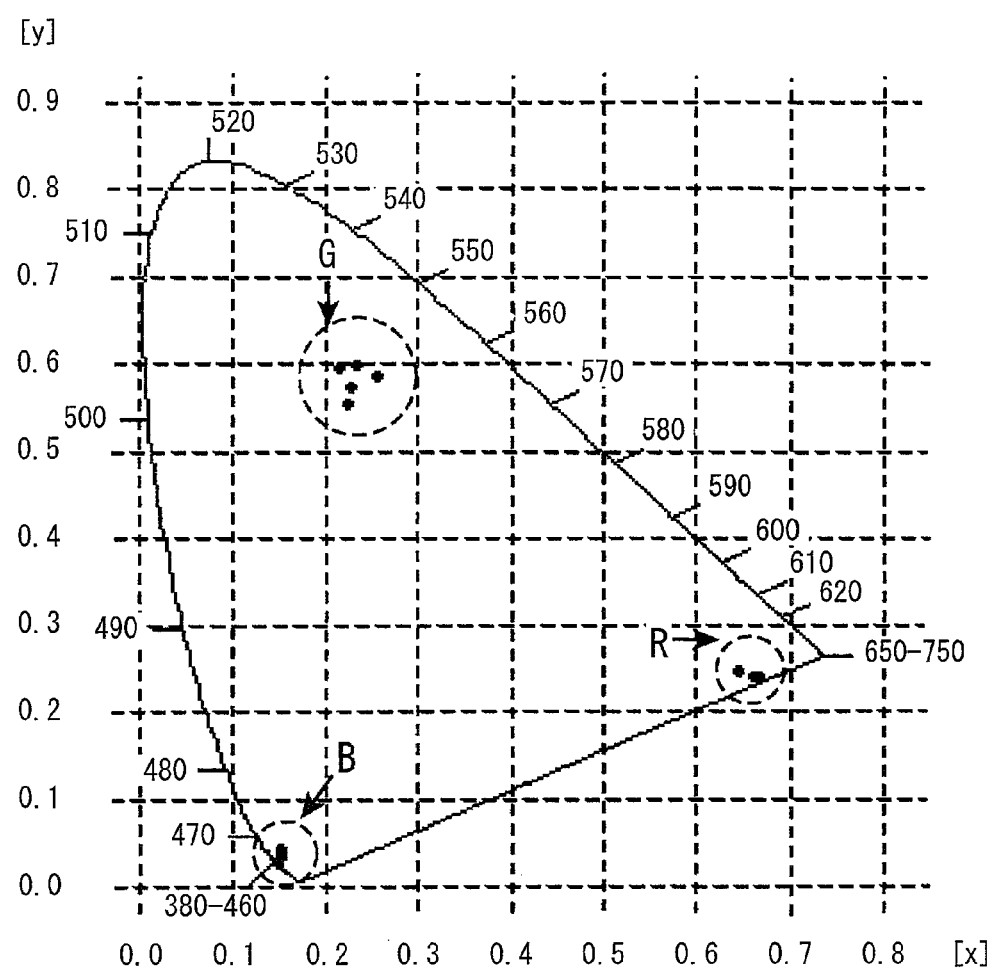
FIG. 16, showing the example of the present invention, is a chromaticity diagram illustrating spectral characteristics.

Further, FIG. 16 shows a chromaticity diagram illustrating spectral characteristics (indicated by dotted lines in FIG. 16) of lights having passed through centers of the light transmitting parts, through which the respective lights from the LEDs of R, G, and B are to pass. As is clear also from FIG. 16, the lights passed through the light transmitting parts corresponding to the LEDs of R, G, and B such that the lights of R, G, and B are separate from one another.

Figure 17:
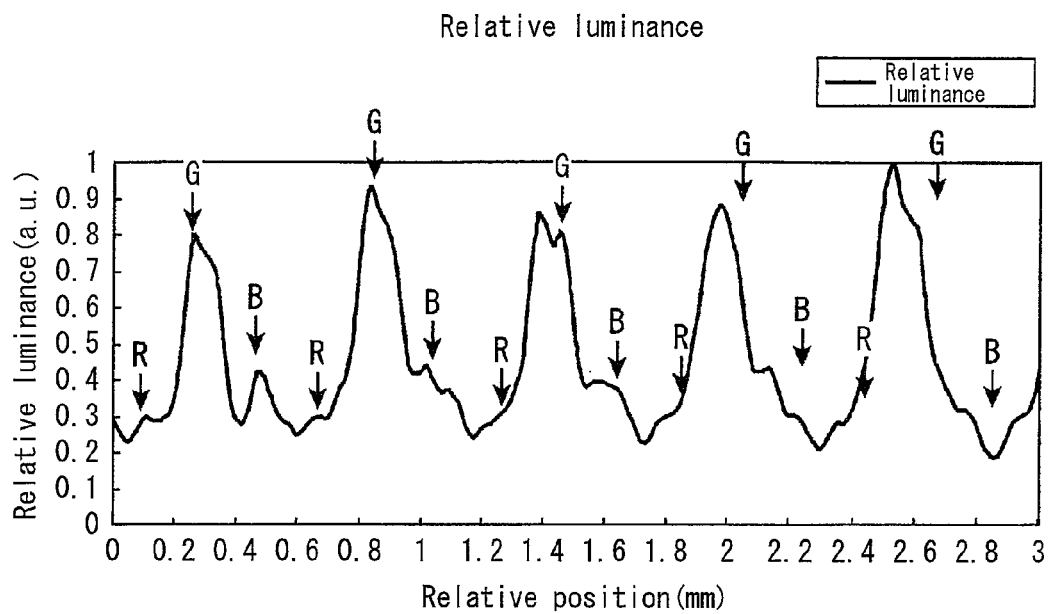
FIG. 17, showing a comparative example of the present invention, is a graph illustrating a measurement result of luminance.

In contrast, FIG. 17 illustrates a result of the comparative example of the present invention. FIG. 17 illustrates measurement results obtained with use of the measurement device and averaged in the entire area in the system length direction. As is clear from FIG. 17, according to the comparative example of the present invention, the lights having the respective dominant wavelengths of R, G, and B emitted from the LEDs were not converged on respective different positions at intervals of approximately 200 µm, and partially overlapped one another.

Figure 18:
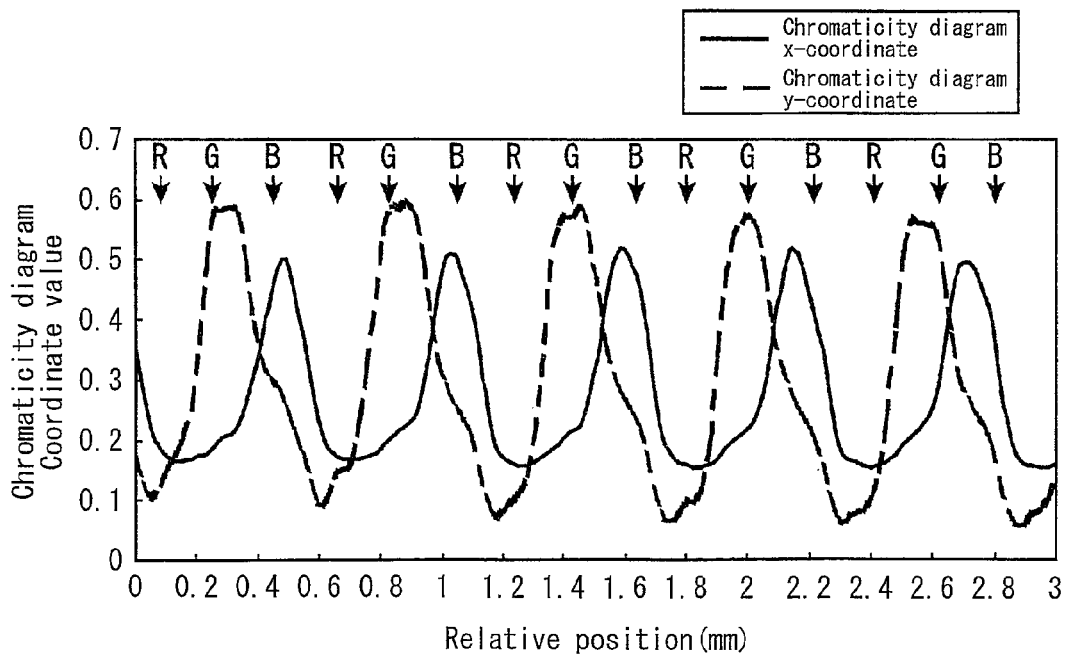
FIG. 18, showing the comparative example of the present invention, is a graph illustrating spatial distribution of chromaticity coordinates.

FIG. 18 more specifically illustrates the results. FIG. 18 shows spatial distribution of chromaticity coordinates. According to FIG. 18, the lights emitted from the respective LEDs of R, G, and B, which lights are supposed to indicate respective different chromaticity coordinates, show spatially modest changes because of the partial overlap.

Figure 19:
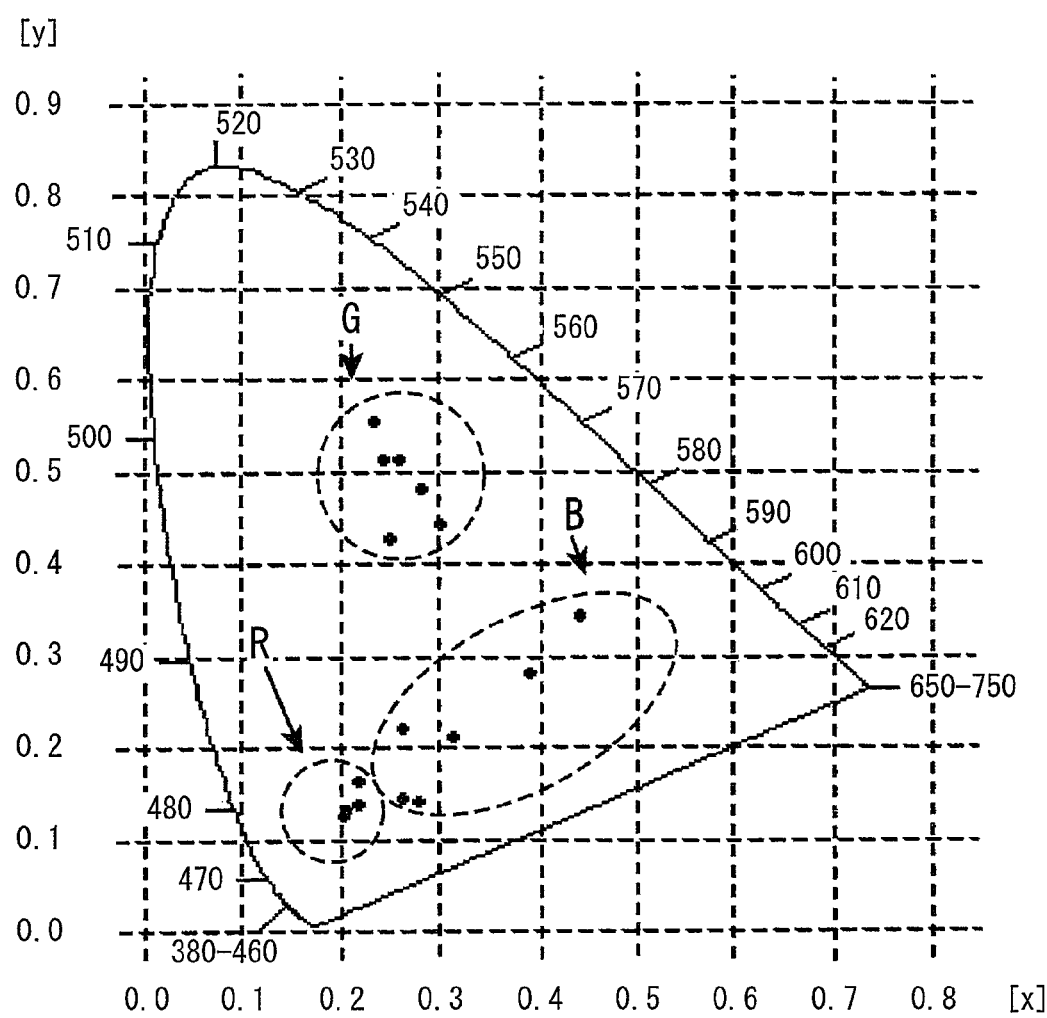
FIG. 19, showing the comparative example of the present invention, is a chromaticity diagram illustrating spectroscopic characteristics.

Further, FIG. 19 shows a chromaticity diagram illustrating spectral characteristics (indicated by dotted lines in FIG. 19) of lights having passed through centers of the light transmitting parts, through which the lights from the LEDs of R, G, and B are to pass. According to FIG. 19, for example a light having passed through a light transmitting part corresponding to the LED of R had a strong bluish tone. That is, the light was not caused to pass through its target light transmitting part. Further, a light having passed through a light transmitting part corresponding to the LED of G was near a center of the chromaticity diagram. This indicates that lights emitted from the other LEDs also passed through the light transmitting part corresponding to the LED of G.

That is, according to the comparative example of the present invention, it was not possible to converge lights from the point light sources 1 on the respective target light transmitting parts such that the lights were separate from one another. Further, a mix of lights emitted from a plurality of point light sources 1 passed through one (1) light transmitting part. As a result, it was not possible to achieve a target color display.

It should be noted that the above measurements were carried out for each of the example and the comparative example of the present invention such that the spatial luminance distribution was measured from the position which deviates by approximately 30 mm from the center of the area irradiated by each of the point light sources 1. In a case where the spatial luminance distribution was measured at the center of the area irradiated by the each of the point light sources 1, both of the example and the comparative example show the same characteristics like those illustrated in FIGS. 14 through 16. This indicates the following fact. That is, in a case where a refracting Fresnel sheet was included so as to reduce a thickness, it is necessary to increase an angle of incidence with which each of lights of different colors strikes the refracting Fresnel sheet. However, this causes a large chromatic aberration, thereby causing penumbrae of the lights of different wavebands to overlap with one another. Eventually, image quality may be deteriorated.

Note however that, even in a case of using the refracting Fresnel sheet, the chromatic aberration of the lights of different colors can be suppressed in the following manner. That is, according to the comparative example of the present invention, the refracting Fresnel sheet was distanced from the point light sources 1 by 60 mm in the system thickness direction. By increasing the distance from the refracting Fresnel sheet to the point light sources 1 and increasing also a focal length of the refracting Fresnel sheet, it is possible to reduce the angle of incidence with which each of the lights of different colors strikes the refracting Fresnel sheet. This makes it possible to suppress the chromatic aberration of the lights of different colors. Note, however, that this cannot be achieved while achieving a thinner backlight system.

As has been described, the example and the comparative example of the present invention demonstrated that the present invention is superior to a conventional art.

INDUSTRIAL APPLICABILITY

The present invention is applicable to a liquid crystal display device etc. including a backlight.

REFERENCE SIGNS LIST

1 Light source (Light emitting section, e.g., point light source)
2 Collimation reflection mirror (irradiating optical system)
3 Microlens array (imaging optical system)
4 Light transmitting part
4A Array of light transmitting parts (Array)
5 Total reflection prism sheet (Irradiating optical system)
6 Fly-eye lens (Imaging optical system)
7 Lenticular lens (Imaging optical system)
8 Total reflection Fresnel sheet (Irradiating optical system)
9 Optical sheet (Integrated configuration including irradiating optical system and imaging optical system)
10 Optical system (Integrated configuration including irradiating optical system and imaging optical system)
11 Element for transmitting light polarized in specified direction and reflecting the other lights (Element for separating polarized lights)
12 Backlight unit (unit)
13 Means for preventing light from light source of either one of adjacent units from entering the other one of the adjacent units (Light shielding plate)
14 Light guide
15 $\lambda/2$ plate (Half-wave plate)
19 Picture element
20 Liquid crystal layer (Layer in which picture elements serving as light transmitting parts are arranged)
21 Drive element
22 Glass substrate (Glass substrate on first side from which light is received)
23 Glass substrate (Glass substrate on a second side from which light is emitted)
25 Liquid crystal element
30 Polarizer
31 Analyzer
40 Diffusing plate
50 Color filter layer

The invention claimed is:

1. A liquid crystal display device, comprising:
a thin backlight system, including:
    a light emitting section configured to emit lights that have different dominant wavelengths;
    a light deflection system configured to deflect the lights from the light emitting section; and
    a plurality of light transmitting portions on which the lights deflected by the light deflection system are to be converged;
the light deflection system including:
    an imaging optical system facing surfaces, of the plurality of light transmitting portions, on which the lights are to be converged; and
    an irradiating optical system facing (i) the light emitting section and (ii) a surface, of the imaging optical system, through which the lights enter the imaging optical system,
    the irradiating optical system being configured such that (a) the lights from the light emitting section are deflected by the irradiating optical system by at least being reflected by the irradiating optical system and (b) the lights thus deflected, which lights have the different dominant wavelengths, leave the irradiating optical system at respective different angles so as to travel parallel or substantially parallel to a normal to each of the plurality of light transmitting portions, and
    the imaging optical system (I) including a plurality of identical lenses arranged so as to correspond to a pitch at which light transmitting portion groups are arranged, each of the light transmitting portion groups including light transmitting portions divided into the number of types of the different dominant wavelengths and (II) being configured so as to converge, in accordance with the different angles, the lights from the irradiating optical system on respective ones of the plurality of light transmitting portions to which the different dominant wavelengths of the lights correspond;
said liquid crystal display device, further including:
    a liquid crystal element including: a liquid crystal layer in which picture elements serving as the plurality of light transmitting portions are arranged; a first glass substrate provided on a first side from which a light is received; and a second glass substrate provided on a second side from which the light is emitted, the liquid crystal layer being sandwiched between the first glass substrate and the second glass substrate;
    a drive element configured to drive the liquid crystal element;
    a polarizer provided on the first glass substrate; and
    an analyzer provided on the second glass substrate;
    wherein
    the imaging optical system includes a fly-eye lens,
    the irradiating optical system includes a total reflection Fresnel sheet,
    the fly-eye lens is provided between the polarizer and the first glass substrate and in contact with the polarizer and the first glass substrate,
    the fly-eye lens includes (i) a convex surface on a side which faces the irradiating optical system and (ii) a flat surface on a side which faces the plurality of light transmitting portions, and
    the total reflection Fresnel sheet includes a flat surface which contacts a surface of the polarizer through which the lights enter.

2. The liquid crystal display device according to claim 1, further comprising a diffusing plate provided on a surface, of the analyzer, which is on the second side.

3. The liquid crystal display device according to claim 2, wherein the liquid crystal layer, the drive element, the analyzer, the diffusing plate, and the second glass substrate are stacked in this order from the liquid crystal layer toward the second side.

4. The liquid crystal display device according to claim 1, further comprising: a diffusing element provided between the drive element and the second glass substrate, the diffusing element having a function of keeping a polarized state of a light.

5. The liquid crystal display device according to claim 4, wherein the liquid crystal layer, the drive element, the diffusing element, the analyzer, and the second glass substrate are stacked in this order from the liquid crystal layer toward the second side.

6. The liquid crystal display device according to claim 1, further comprising a color filter layer provided on a surface, of the second glass substrate, which is on the first side.

7. The liquid crystal display device according to claim 1, wherein the imaging optical system is provided between the polarizer and the first glass substrate.

8. The liquid crystal display device according to claim 1, wherein stack positions of the liquid crystal element and the drive element are exchanged.

9. A liquid crystal display device, comprising:
a thin backlight system, including:
a light emitting section configured to emit lights that have different dominant wavelengths; and a plurality of light transmitting portions arranged in a predetermined manner, the thin backlight system deflecting the lights and then converging the lights on the plurality of light transmitting portions,
said thin backlight system, further comprising:
an imaging optical system provided so as to face surfaces, of the plurality of light transmitting portions, on which the lights are to be converged, the imaging optical system (i) including a plurality of identical lenses arranged in a vertical and/or a horizontal direction at a pitch determined by multiplying a pitch at which the plurality of light transmitting portions are arranged in a vertical and/or a horizontal direction by the number of types of the different dominant wavelengths and (ii) being configured so as to converge the lights from the light emitting section on respective ones of the plurality of light transmitting portions to which the different dominant wavelengths of the lights correspond; and
an irradiating optical system provided so as to face (a) the light emitting section and (b) a surface, of the imaging optical system, through which the lights enter the imaging optical system, the irradiating optical system being configured such that (I) the lights from the light emitting section, which lights have the different dominant wavelengths, are deflected by the irradiating optical system by at least being reflected by the irradiating optical system so as to be separate from each other, (II) the lights thus deflected leave the irradiating optical system so as to travel parallel or substantially parallel to a normal to each of the plurality of light transmitting portions and (III) the lights enter the plurality of identical lenses of the imaging optical system through a surface, of the imaging optical system, which is opposite to the plurality of light transmitting portions;
said liquid crystal display device, further comprising:
a liquid crystal element including: a liquid crystal layer in which picture elements serving as the plurality of light transmitting portions are arranged; a first glass substrate provided on a first side from which a light is received; and a second glass substrate provided on a second side from which the light is emitted, the liquid crystal layer being sandwiched between the first glass substrate and the second glass substrate;
a drive element configured to drive the liquid crystal element;
a polarizer provided on the first glass substrate; and
an analyzer provided on the second glass substrate; wherein
the imaging optical system includes a fly-eye lens,
the irradiating optical system includes a total reflection Fresnel sheet,
the fly-eye lens is provided between the polarizer and the first glass substrate and in contact with the polarizer and the first glass substrate,
the fly-eye lens includes (i) a convex surface on a side which faces the irradiating optical system and (ii) a flat surface on a side which faces the plurality of light transmitting portions, and
the total reflection Fresnel sheet includes a flat surface which contacts a surface of the polarizer through which the lights enter.

10. The liquid crystal display device according to claim 9, further comprising a diffusing plate provided on a surface, of the analyzer, which is on the second side.

11. The liquid crystal display device according to claim 10, wherein the liquid crystal layer, the drive element, the analyzer, the diffusing plate, and the second glass substrate are stacked in this order from the liquid crystal layer toward the second side.

12. The liquid crystal display device according to claim 9, further comprising: a diffusing element provided between the drive element and the second glass substrate, the diffusing element having a function of keeping a polarized state of a light.

13. The liquid crystal display device according to claim 12, wherein the liquid crystal layer, the drive element, the diffusing element, the analyzer, and the second glass substrate are stacked in this order from the liquid crystal layer toward the second side.

14. The liquid crystal display device according to claim 9, further comprising a color filter layer provided on a surface, of the second glass substrate, which is on the first side.

15. The liquid crystal display device according to claim 9, wherein the imaging optical system is provided between the polarizer and the first glass substrate.

16. The liquid crystal display device according to claim 9, wherein stack positions of the liquid crystal element and the drive element are exchanged.

* * * * *